US012008216B1

United States Patent
Boesel et al.

(10) Patent No.: US 12,008,216 B1
(45) Date of Patent: Jun. 11, 2024

(54) DISPLAYING A VOLUMETRIC REPRESENTATION WITHIN A TAB

(71) Applicant: Apple Inc., Cupertino, CA (US)

(72) Inventors: Benjamin Hunter Boesel, Sunnyvale, CA (US); Jonathan Perron, Milpitas, CA (US); Shih Sang Chiu, San Francisco, CA (US); David H. Y. Huang, San Mateo, CA (US); Jonathan Ravasz, Sunnyvale, CA (US); Jordan Alexander Cazamias, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 195 days.

(21) Appl. No.: 17/324,887

(22) Filed: May 19, 2021

Related U.S. Application Data

(60) Provisional application No. 63/045,254, filed on Jun. 29, 2020.

(51) Int. Cl.
*G06F 3/0483* (2013.01)
*G06F 3/04815* (2022.01)
(Continued)

(52) U.S. Cl.
CPC ........ *G06F 3/0483* (2013.01); *G06F 3/04815* (2013.01); *G06F 3/04817* (2013.01); *G06F 3/04842* (2013.01)

(58) Field of Classification Search
CPC .............. G06F 3/0483; G06F 3/04815; G06F 3/04817; G06F 3/04842
See application file for complete search history.

(56) References Cited

U.S. PATENT DOCUMENTS

| 8,631,341 B2 | 1/2014 | Sauve et al. |
| 9,098,248 B2 * | 8/2015 | Suzuki ................. G06F 3/0482 |

(Continued)

OTHER PUBLICATIONS

S. Hickey, L. Arhippainen, J. H. Vatjus-Anttila and M. Pakanen, "User experience study of concurrent virtual environments with 2D tab and 3D portal UIs," 2013 International Conference on Engineering, Technology and Innovation (ICE) & IEEE International Technology Management Conference, 2013, pp. 1-12. (Year: 2013).*

*Primary Examiner* — Kieu D Vu
*Assistant Examiner* — Blaine T Basom
(74) *Attorney, Agent, or Firm* — Fernando & Partners, LLP

(57) ABSTRACT

A method is performed at an electronic device including one or more processors, a non-transitory memory, and a display. The method includes obtaining a first volumetric object associated with a first content region. The first content region is associated with a first tab. The method includes generating a first volumetric representation of the first volumetric object based on a function of the first tab. The first volumetric representation is displayable within the first tab. The method includes concurrently displaying, on the display, the first content region and the first volumetric representation within the first tab. In some implementations, the method includes changing a view of the first volumetric representation, such as rotating the first volumetric representation or according to a positional change to the electronic device. In some implementations, the method includes generating a plurality of volumetric representations and classifying the plurality of volumetric representations.

17 Claims, 35 Drawing Sheets

(51) Int. Cl.
*G06F 3/04817* (2022.01)
*G06F 3/04842* (2022.01)

(56) References Cited

U.S. PATENT DOCUMENTS

| | | | |
|---|---|---|---|
| 10,216,370 B2 | 2/2019 | Barrus et al. | |
| 10,466,871 B2* | 11/2019 | Barrus | G06F 3/0482 |
| 10,860,675 B2* | 12/2020 | Ashby | G06F 16/958 |
| 10,909,762 B2* | 2/2021 | Karalis | G06T 11/60 |
| 2006/0020904 A1* | 1/2006 | Aaltonen | G06F 3/0482 |
| | | | 715/850 |
| 2008/0282179 A1 | 11/2008 | Kim et al. | |
| 2011/0138313 A1* | 6/2011 | Decker | G06F 3/0481 |
| | | | 715/777 |
| 2011/0191344 A1* | 8/2011 | Jin | G06F 16/00 |
| | | | 707/769 |
| 2012/0127201 A1* | 5/2012 | Kim | G09G 5/377 |
| | | | 345/633 |
| 2012/0131485 A1 | 5/2012 | Svendsen et al. | |
| 2014/0250390 A1* | 9/2014 | Holmes | G06F 3/0482 |
| | | | 715/760 |
| 2015/0220228 A1* | 8/2015 | Podemsky | G06F 3/0483 |
| | | | 715/744 |
| 2016/0124595 A1* | 5/2016 | Kim | G06F 3/0483 |
| | | | 715/769 |
| 2018/0284885 A1* | 10/2018 | Kim | G06F 3/013 |

\* cited by examiner

DISPLAYING A VOLUMETRIC REPRESENTATION WITHIN A TAB

CROSS-REFERENCE TO RELATED APPLICATION

This application claims priority to U.S. Provisional Patent App. No. 63/045,254, filed on Jun. 29, 2020, which is hereby incorporated by reference in its entirety.

TECHNICAL FIELD

The present disclosure relates to displaying content, and, in particular, displaying a volumetric representation within a tab.

BACKGROUND

A user interface may include one or more tabs, such as in a tabbed web browsing application. Typically, each of the tabs includes a content indicator that is indicative of corresponding application content. However, a content indicator provides limited information with respect to corresponding application content. For example, the content indicator corresponds to a text string that indicates the title of a corresponding web page. Accordingly, navigating between application content based on content indicators is slow and cumbersome. Additionally, the limited information provided by the content indicators leads to navigation errors (e.g., going to an undesired web page), increasing utilization of processing and memory resources.

SUMMARY

In accordance with some implementations, a method is performed at an electronic device with one or more processors, a non-transitory memory, and a display. The method includes obtaining a first volumetric object associated with a first content region window. The first content region is associated with a first tab. The method includes generating a first volumetric representation of the first volumetric object based on a function of the first tab. The first volumetric representation is displayable within the first tab. The method includes concurrently displaying, on the display, the first content region and the first volumetric representation within the first tab.

In accordance with some implementations, an electronic device includes one or more processors, a non-transitory memory, and a display. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
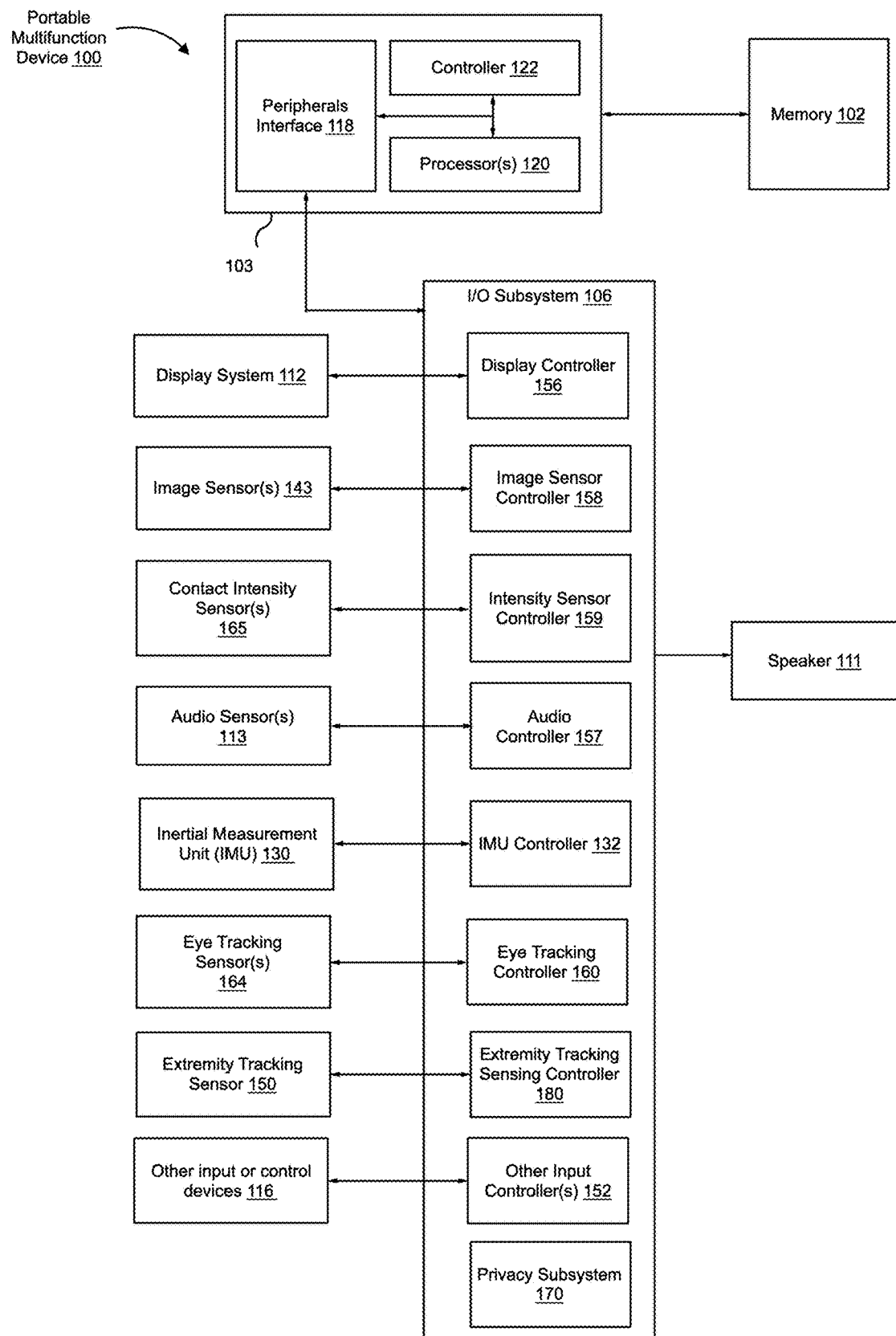
FIG. 1 is a block diagram of an example of a portable multifunction device in accordance with some implementations.

A computer application may provide a user interface that includes one or more tabs. Typically, each of the tabs includes a content indicator that is indicative of corresponding application content. For example, a web browsing application provides multiple browsing tabs, and each of the browsing tabs includes a content indicator that is indicative of a corresponding web page. However, a given content indicator provides limited information with respect to corresponding application content, such as merely providing textual information associated with corresponding application content. Accordingly, navigating between application content based on the content indicators is slow and cumbersome. Additionally, the limited information provided by the content indicators leads to navigation errors (e.g., going to an undesired web page), increasing utilization of processing and memory resources.

By contrast, various implementations disclosed herein include methods, electronic devices, and systems for displaying a volumetric representation (e.g., three-dimensional (3D)) within a corresponding tab. In contrast to other tabbed interfaces, the volumetric representation provides richer and more useful information characterizing a corresponding content region, resulting in an enhanced user experience. Moreover, in a multi-tab implementation, displaying respective volumetric representations within corresponding tabs enables more efficient navigation between content regions, thereby reducing resource utilization. In some implementations, a volumetric representation is user-selected and therefore tailored to user preferences, further enhancing the user experience. In some implementations, a volumetric representation is manipulatable (e.g., rotatable or movable). In some implementations, a method includes classifying a plurality of volumetric representations into groups, and displaying within a browsing history interface corresponding group indicators associated with the groups.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Various examples of electronic systems and techniques for using such systems in relation to various computer-generated reality technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113

(e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to an operating environment. In some implementations, the other input or control devices 116 include a depth sensor and/or a time of flight sensor that obtains depth information characterizing an operating environment.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may include a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a stylus.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within an operating environment. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
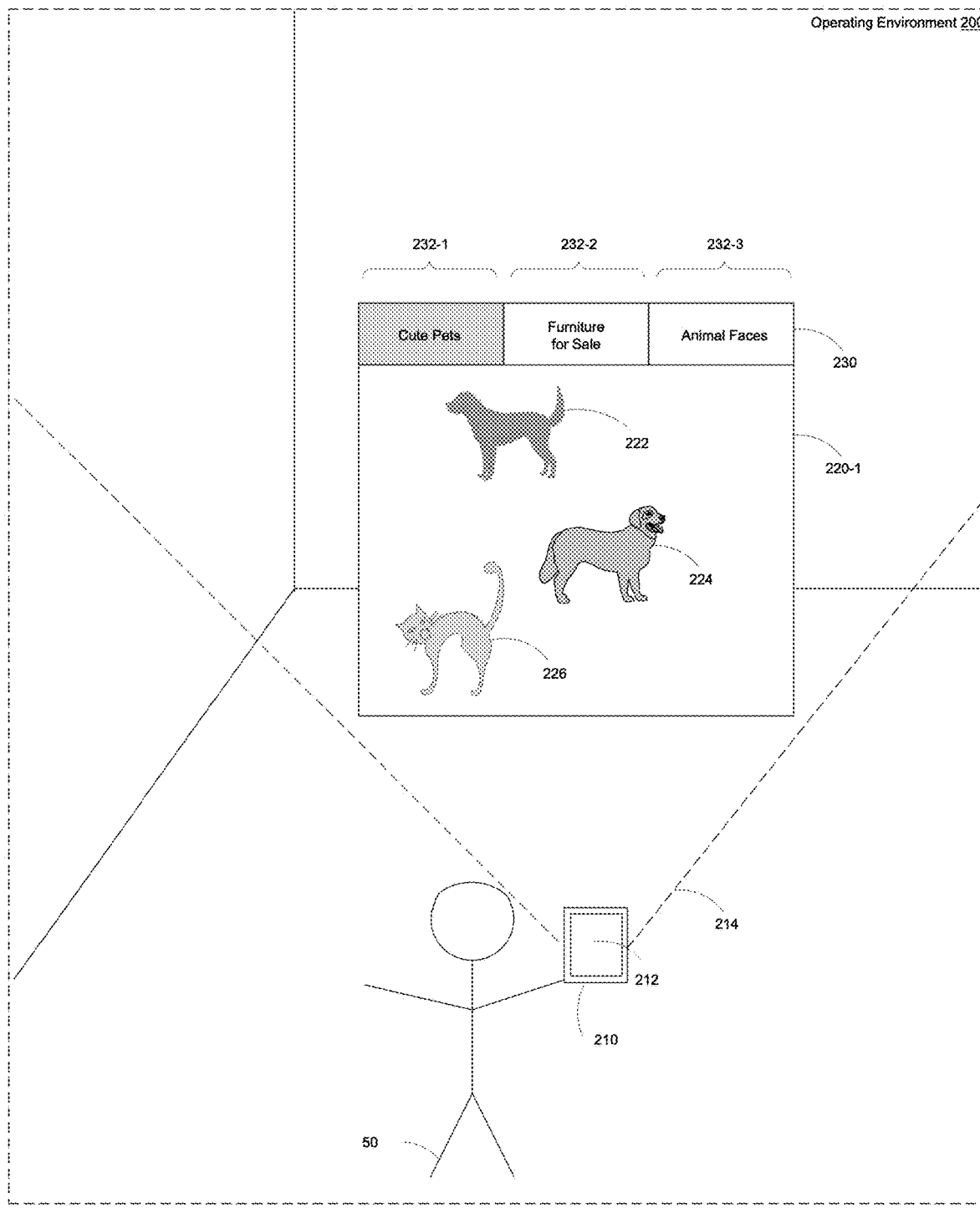
FIGS. 2A-2Q are examples of displaying volumetric representations within respective tabs in accordance with some implementations.
Figure 2B:
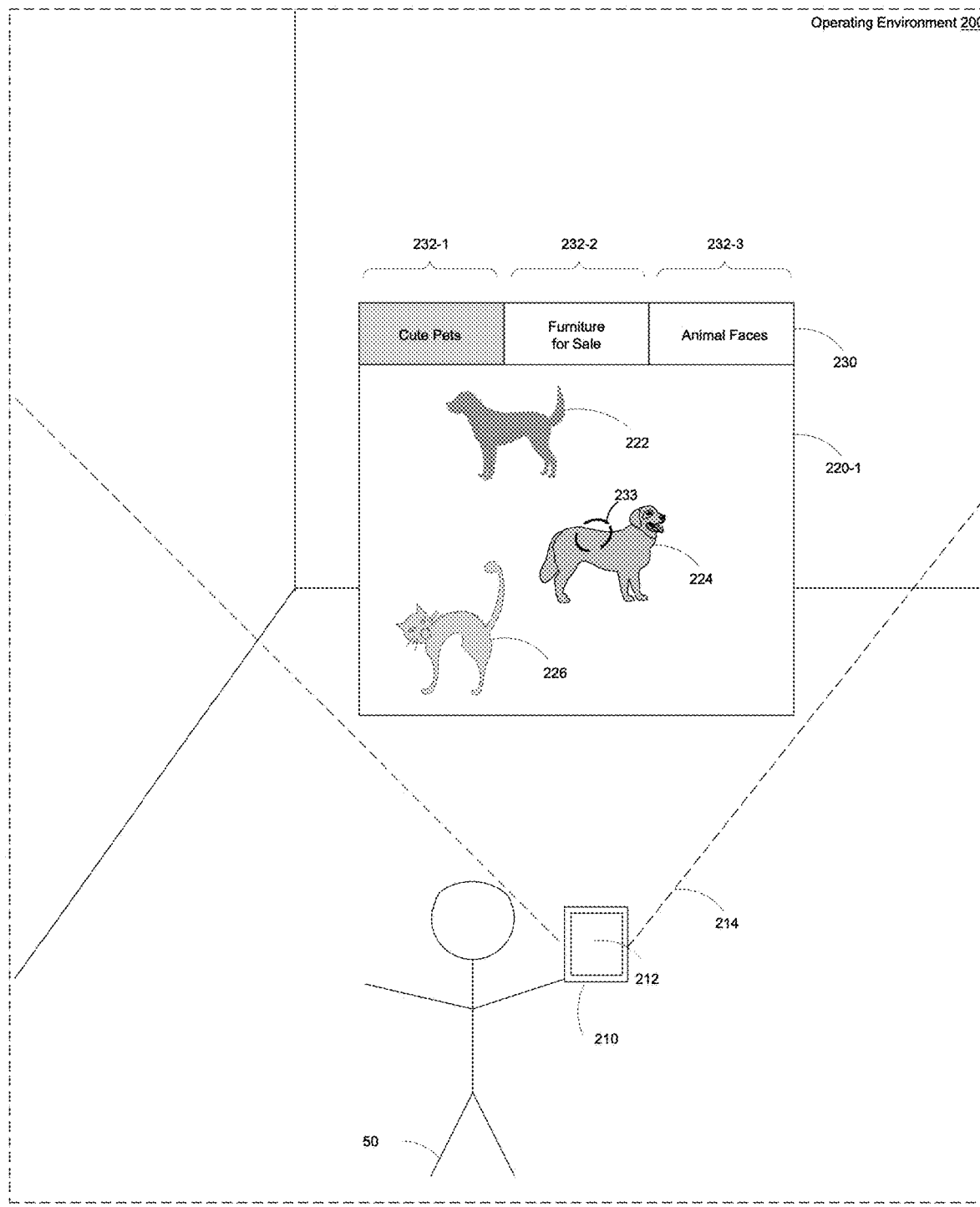
Figure 2C:
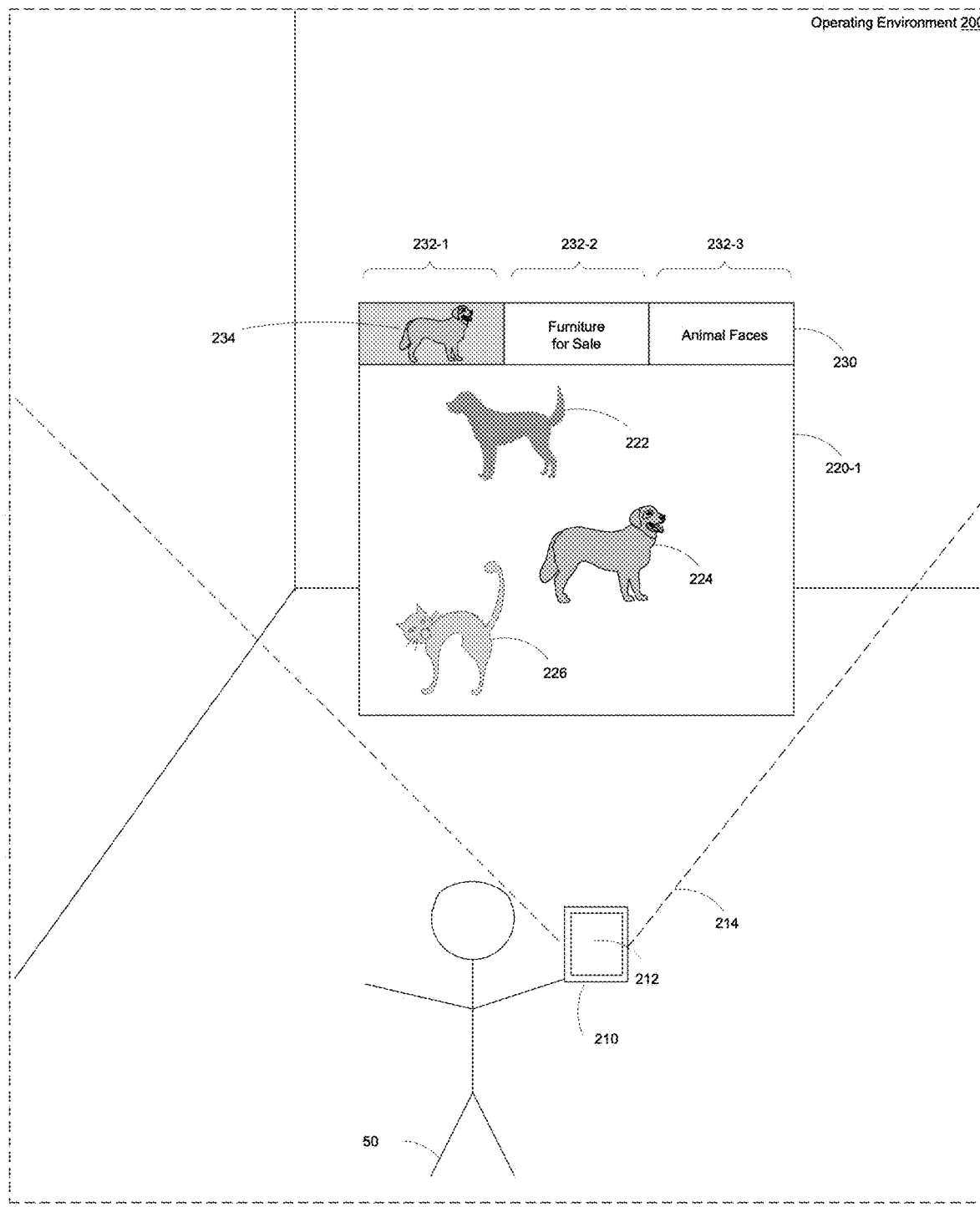
Figure 2D:
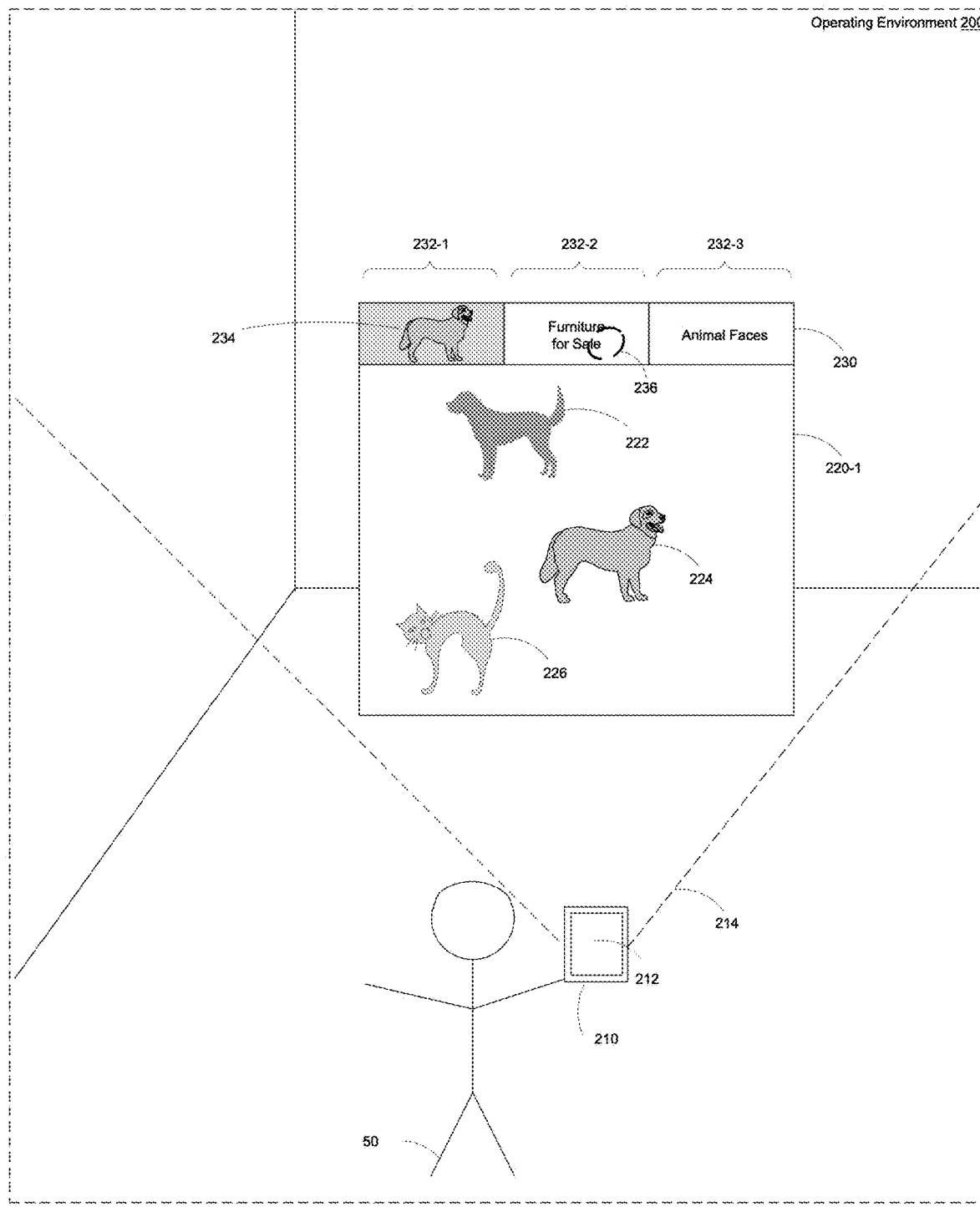
Figure 2E:
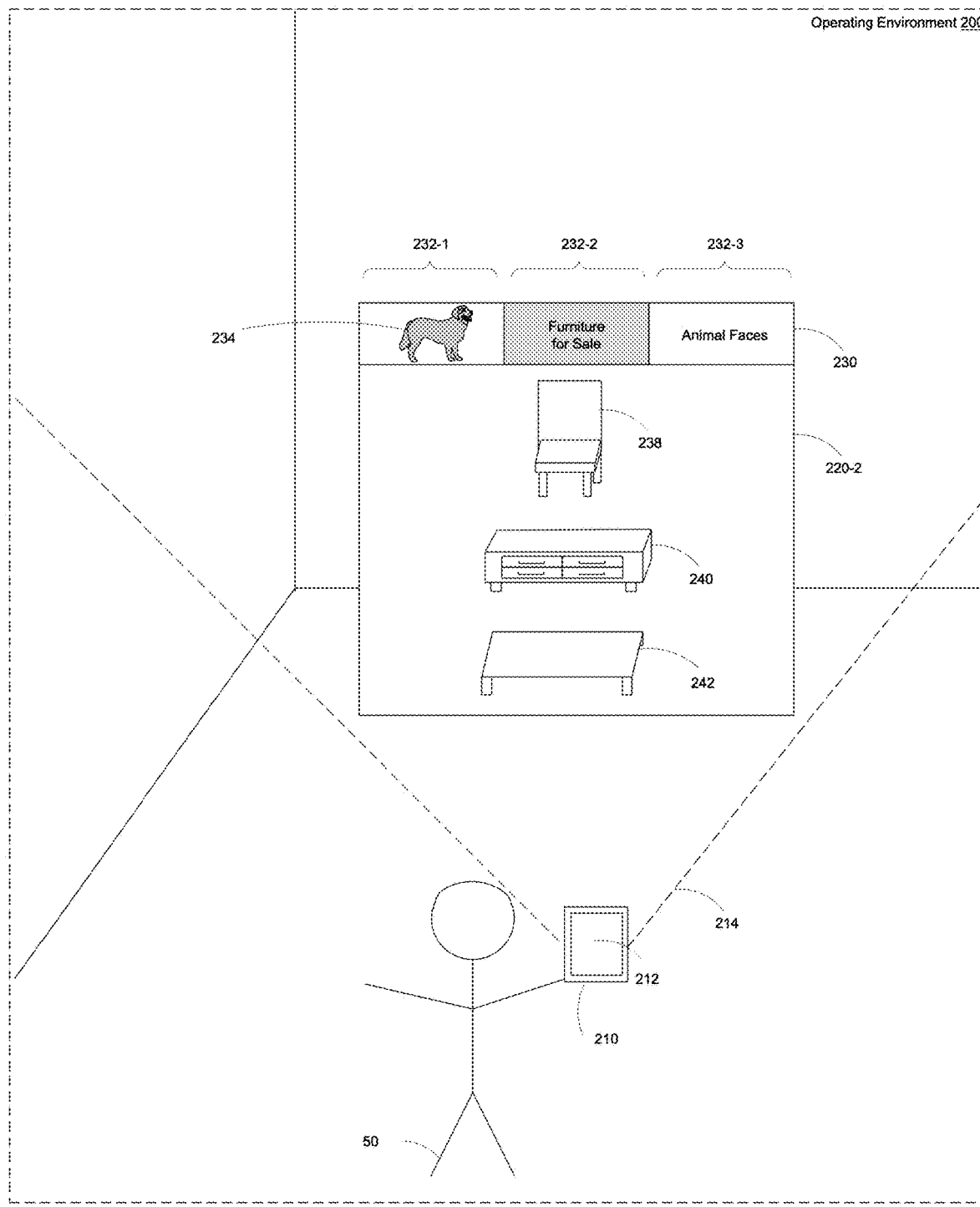
Figure 2F:
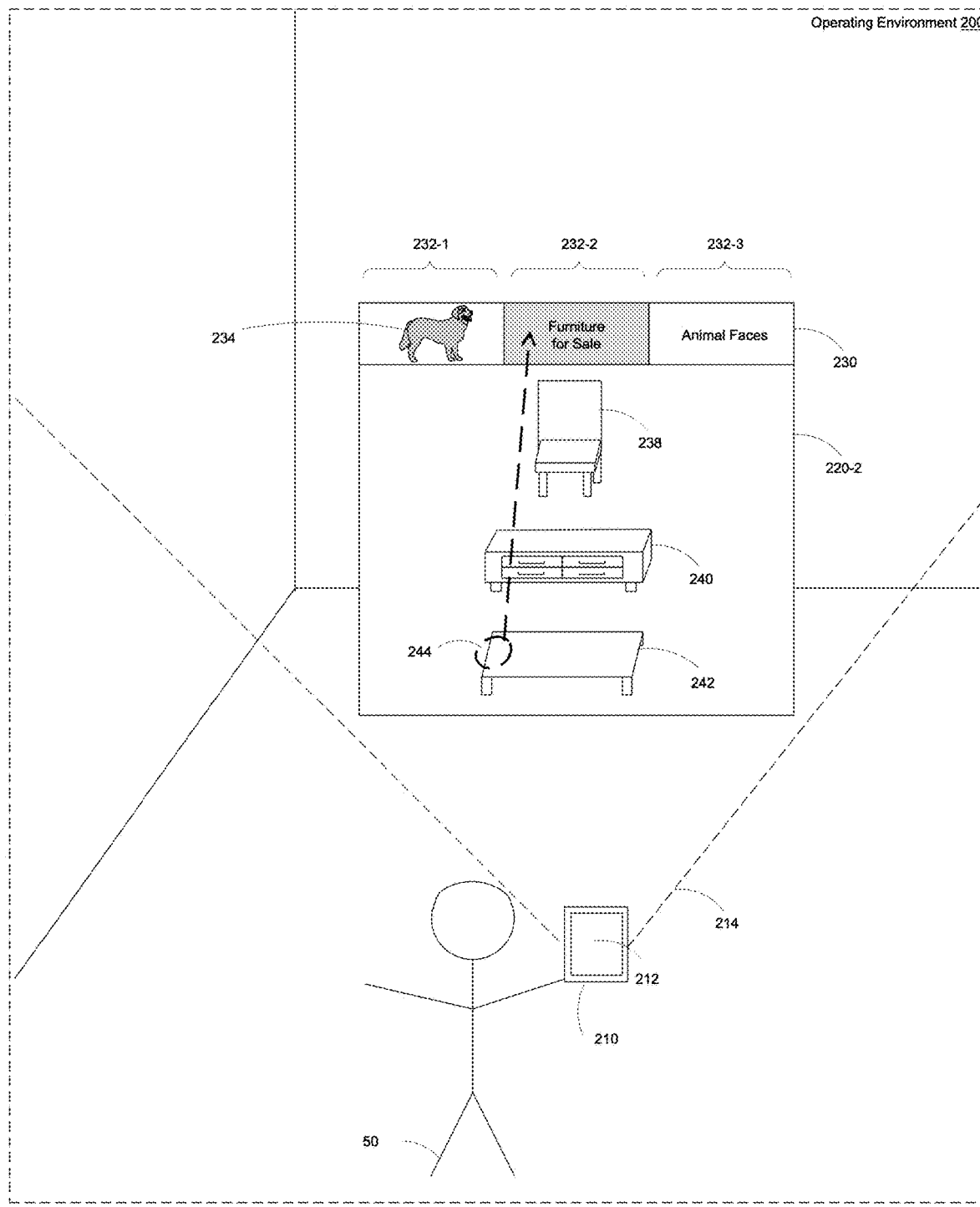
Figure 2G:
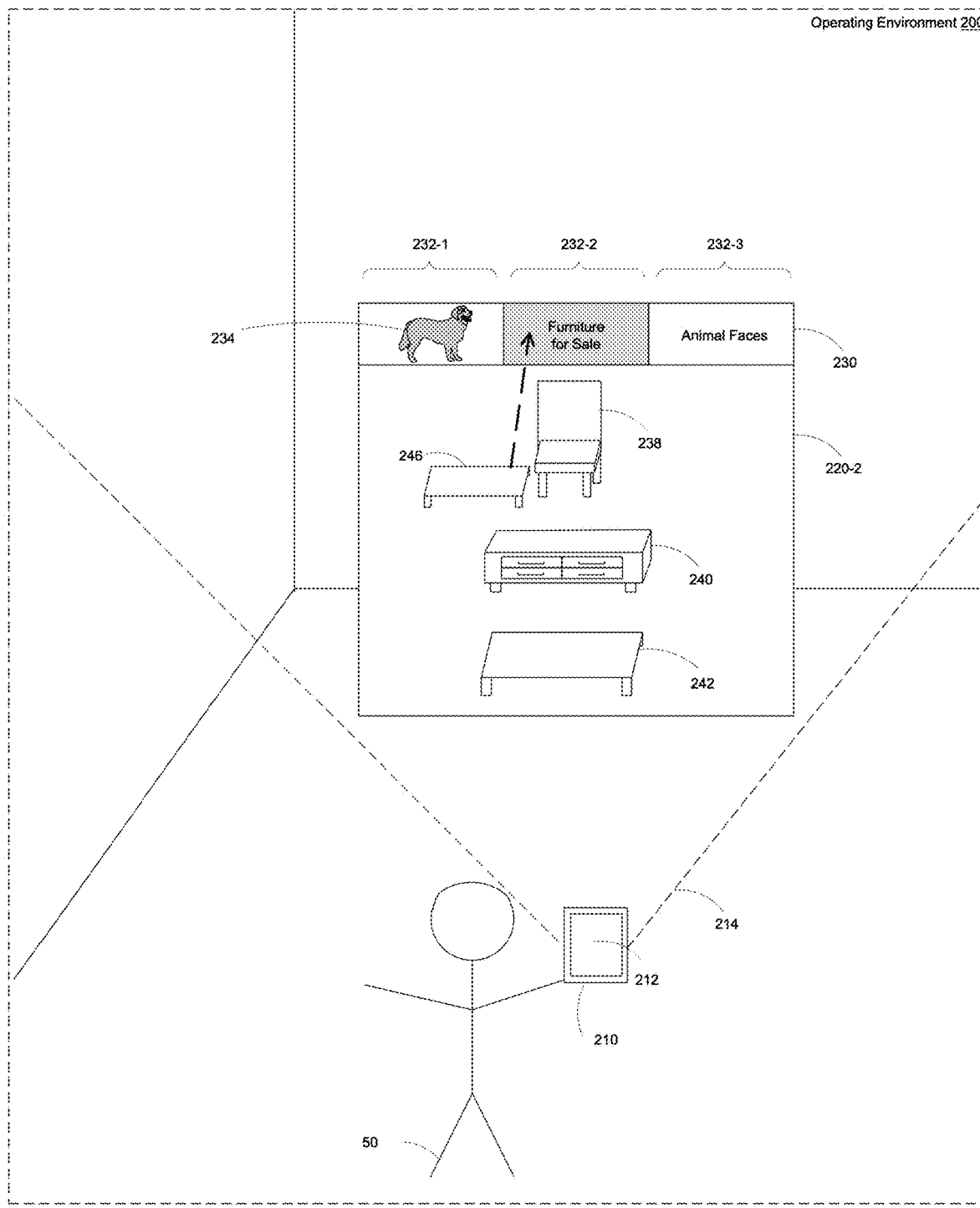
Figure 2H:
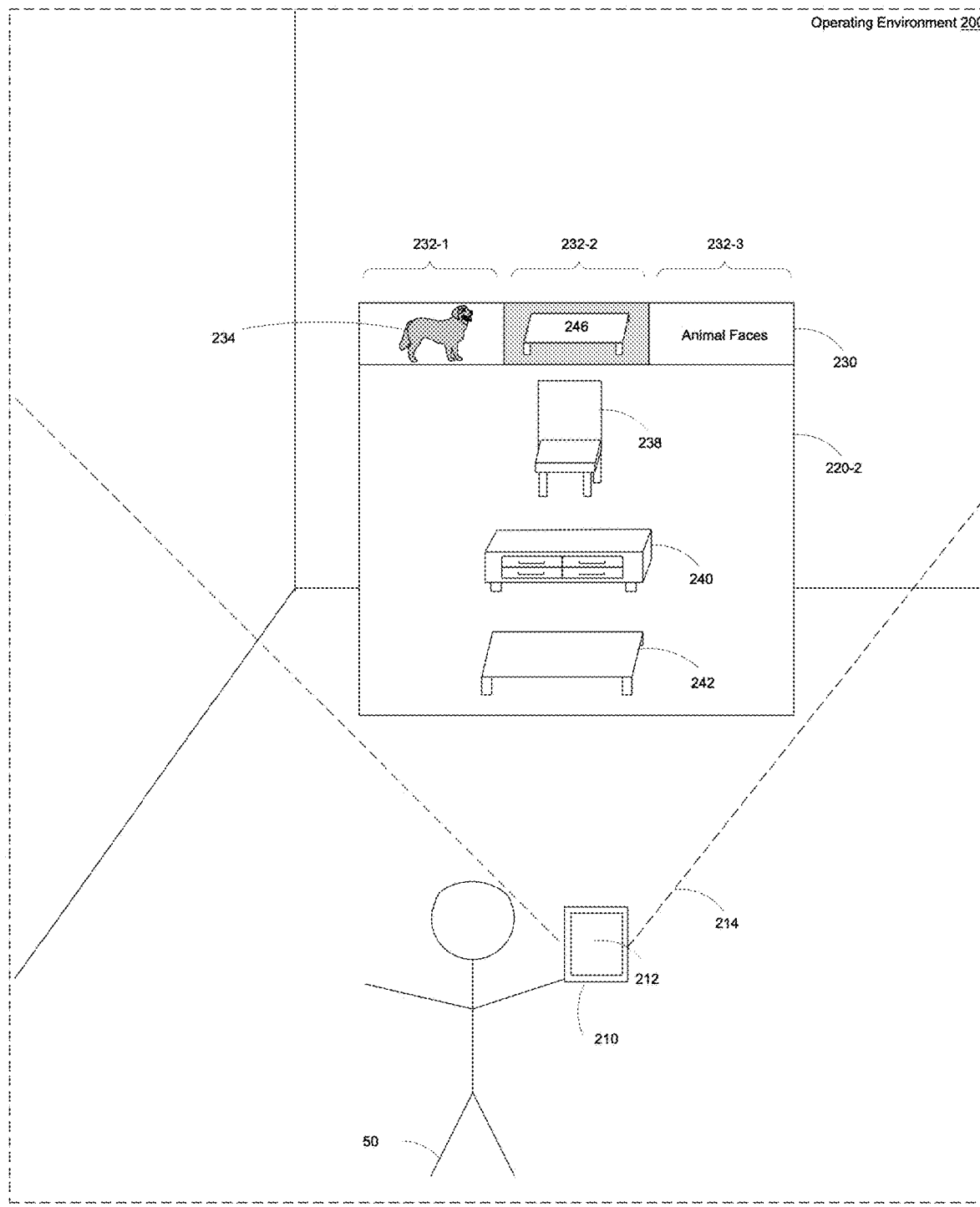
Figure 2I:
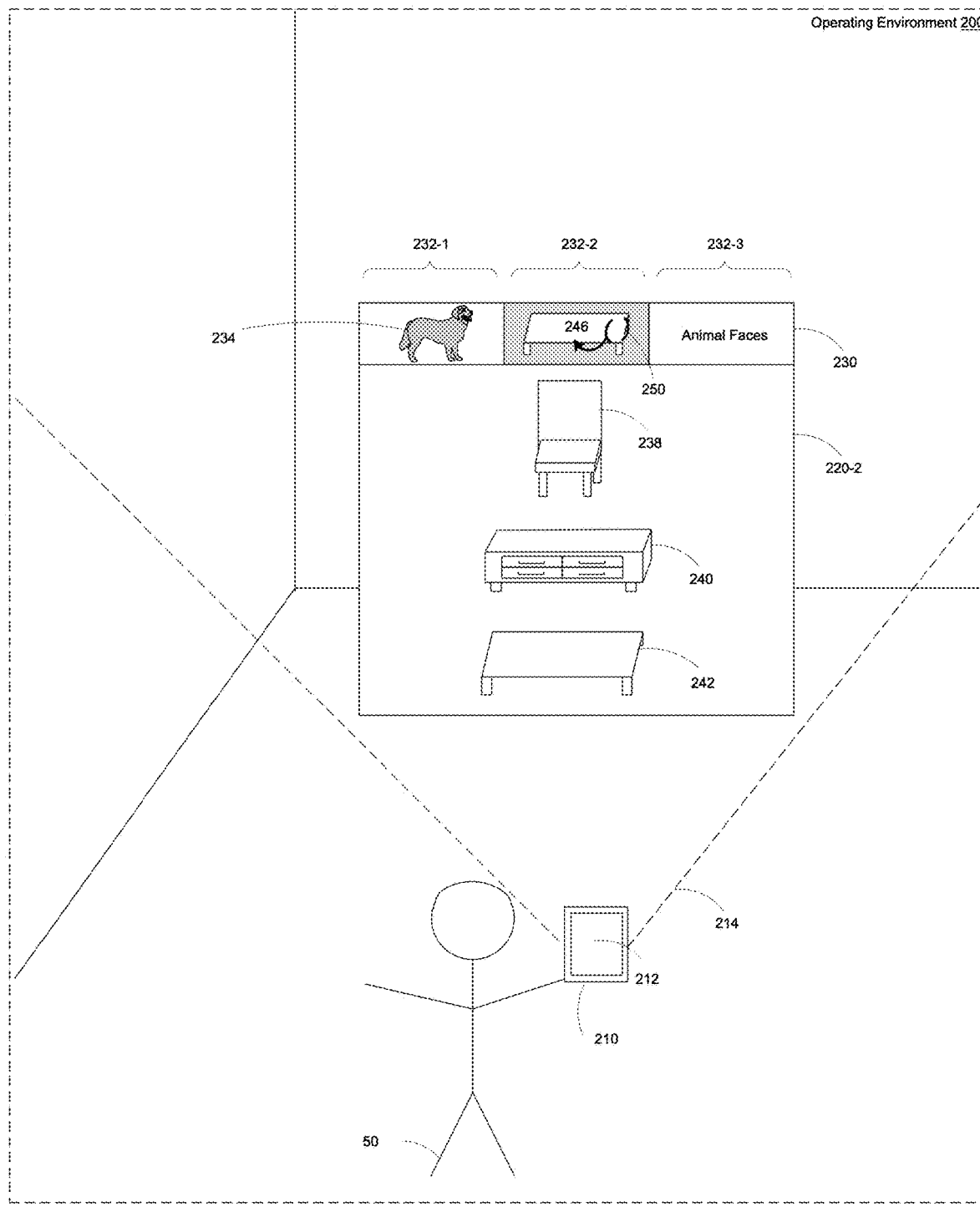
Figure 2J:
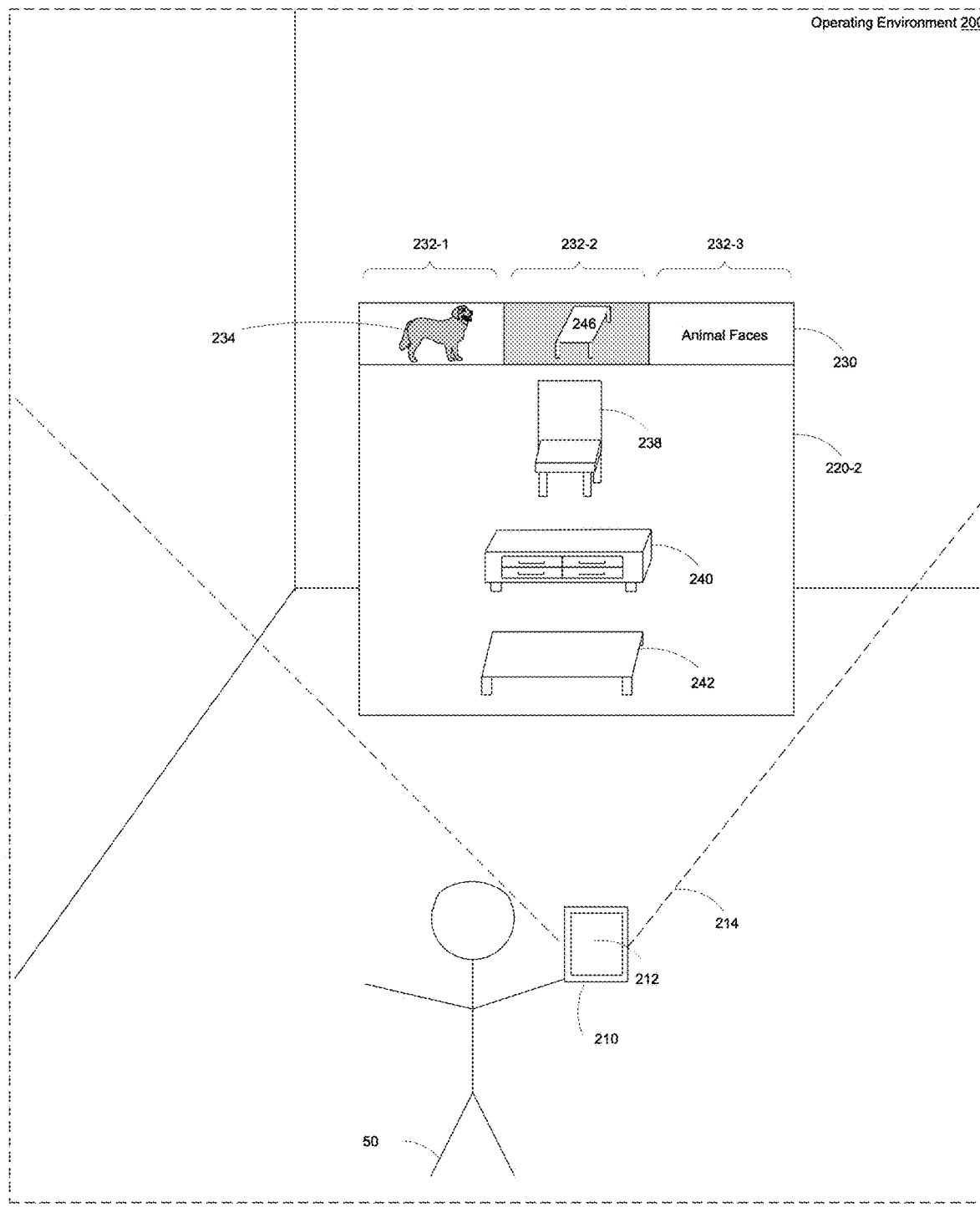
Figure 2K:
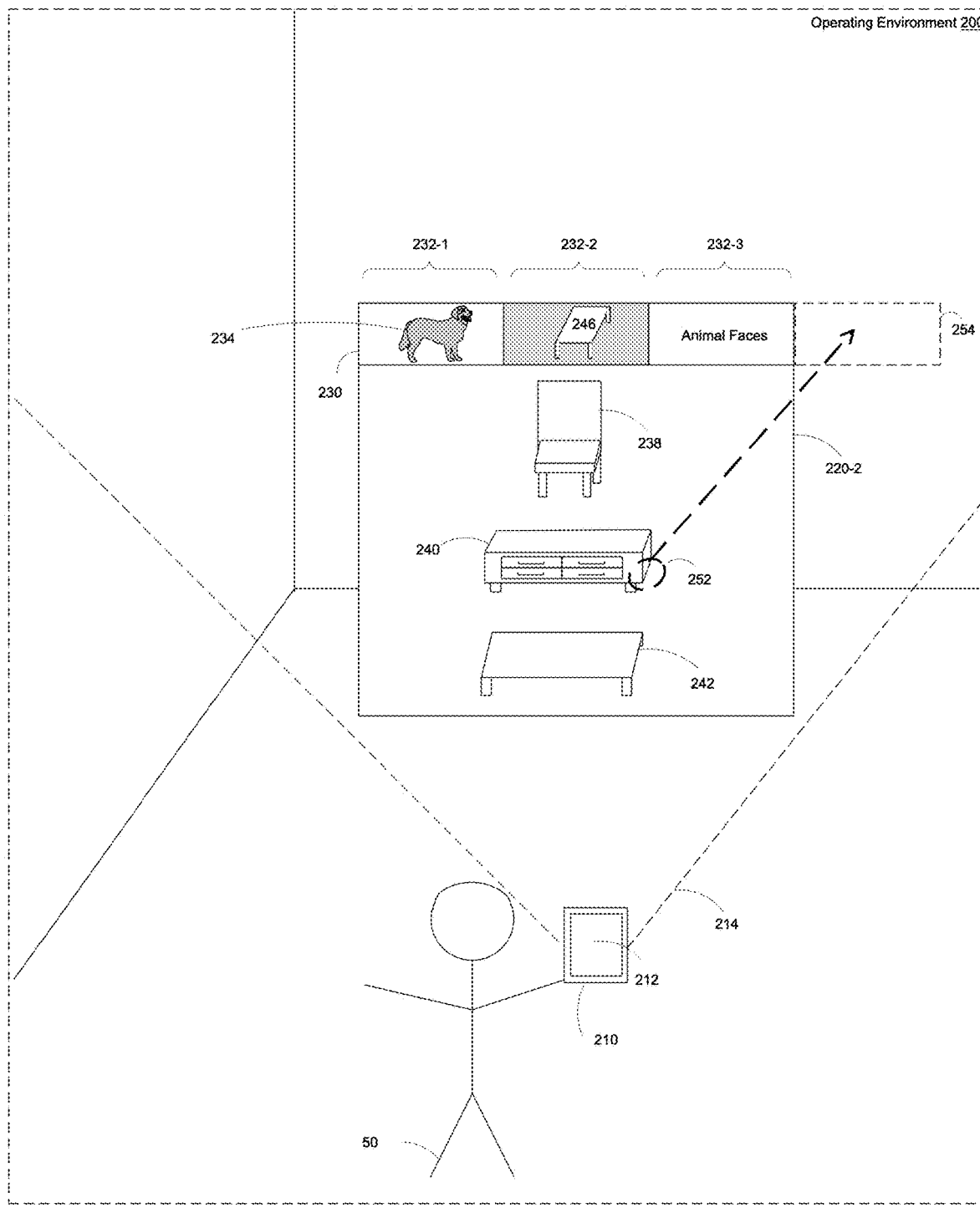
Figure 2L:
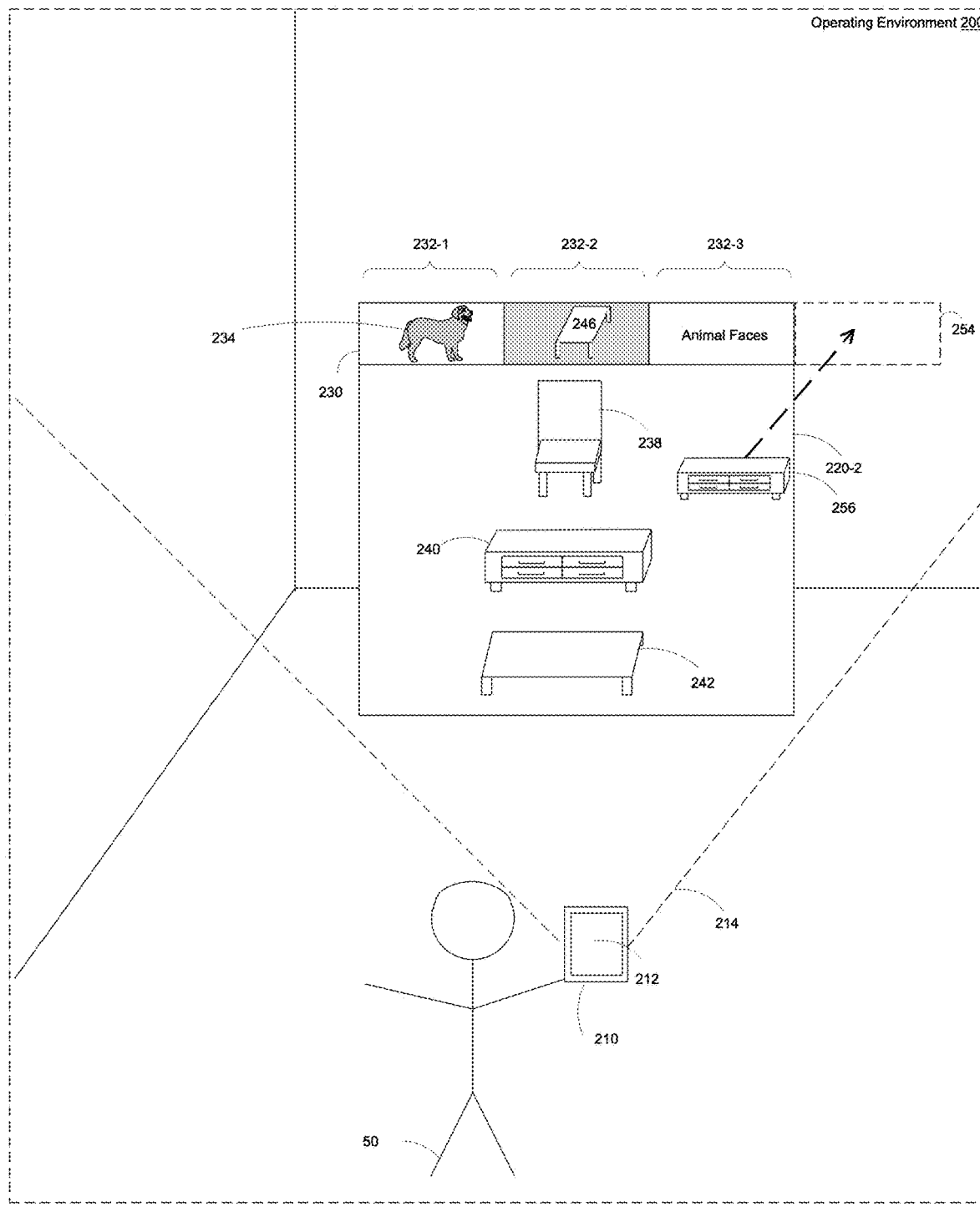
Figure 2M:
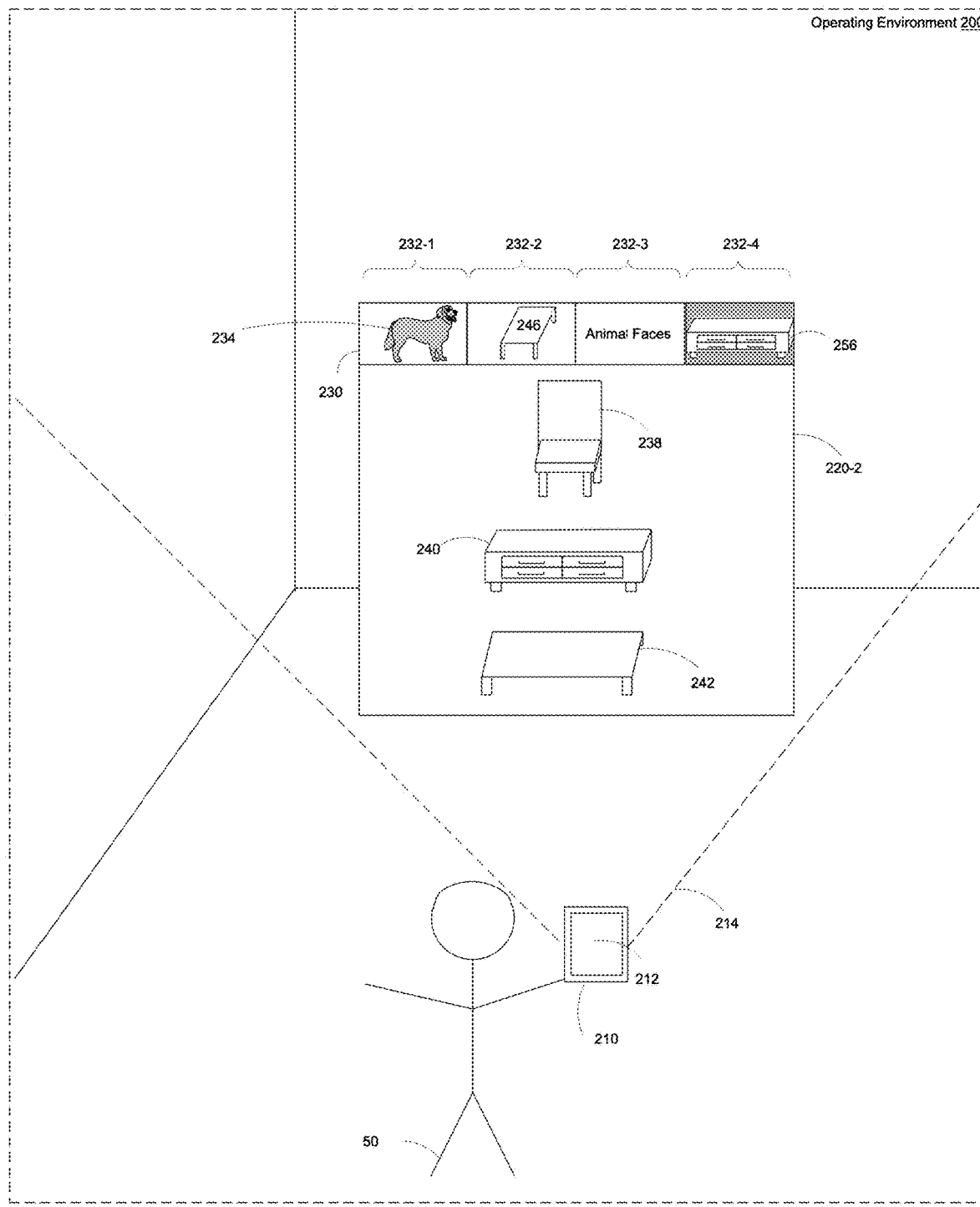
Figure 2N:
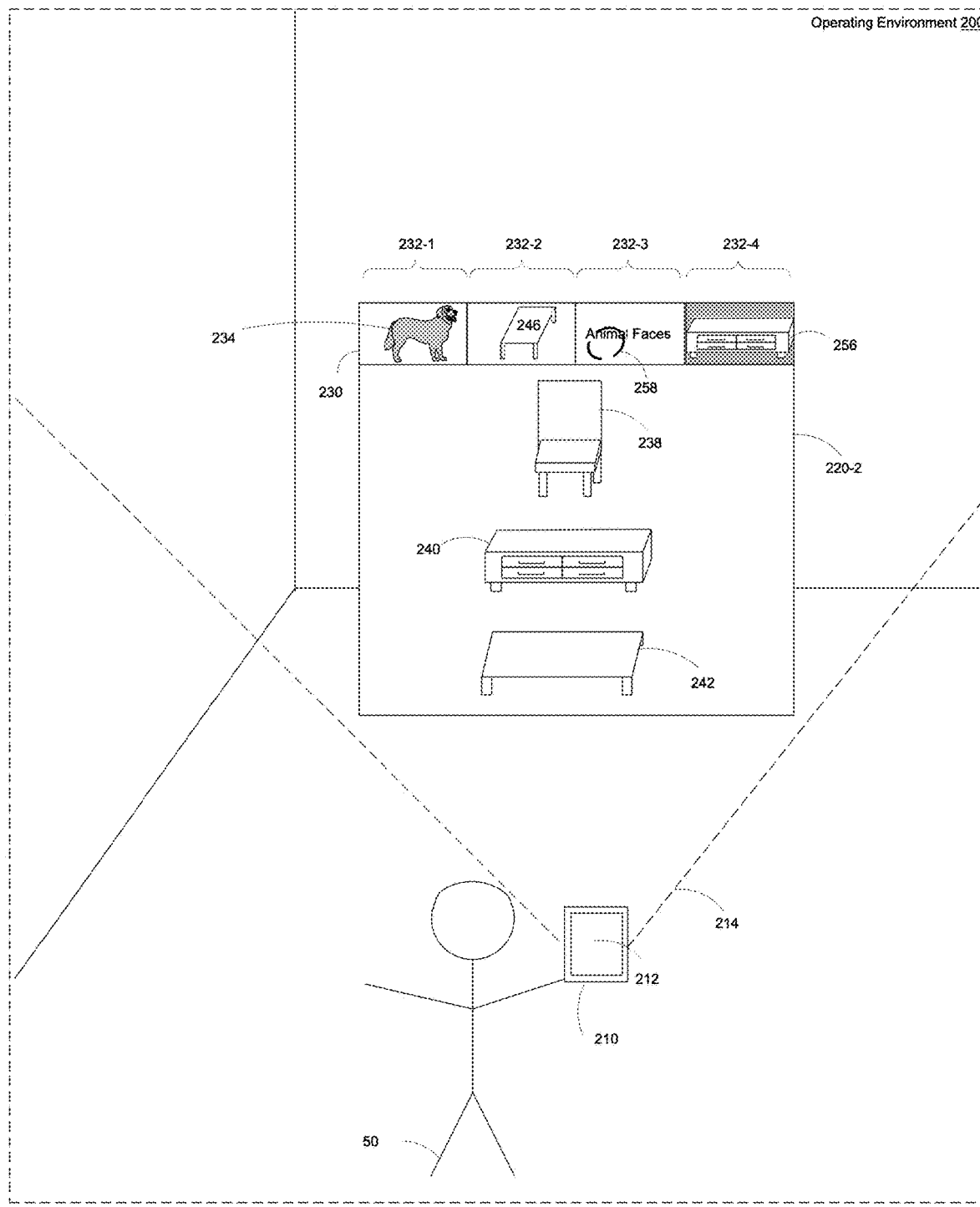
Figure 2O:
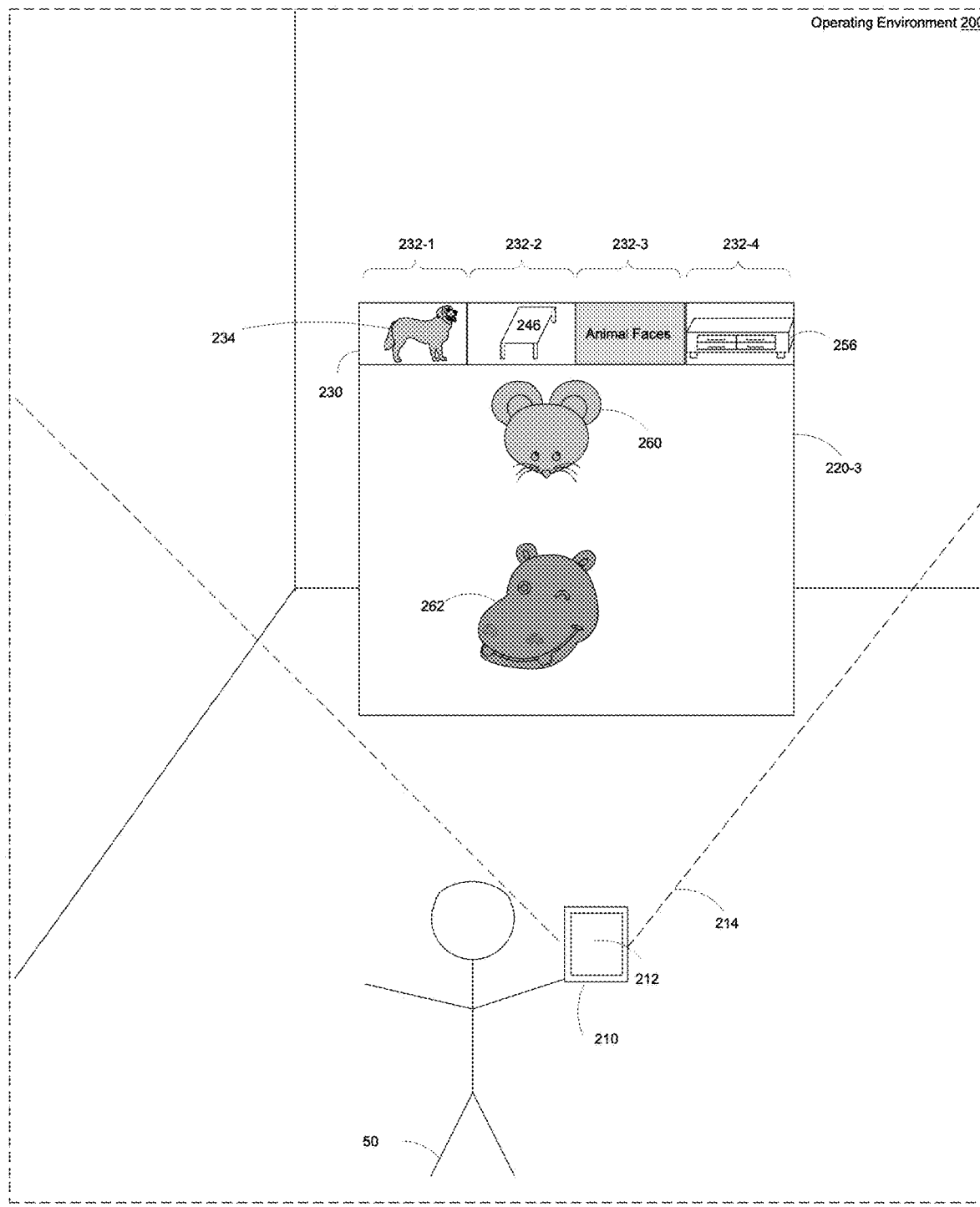
Figure 2P:
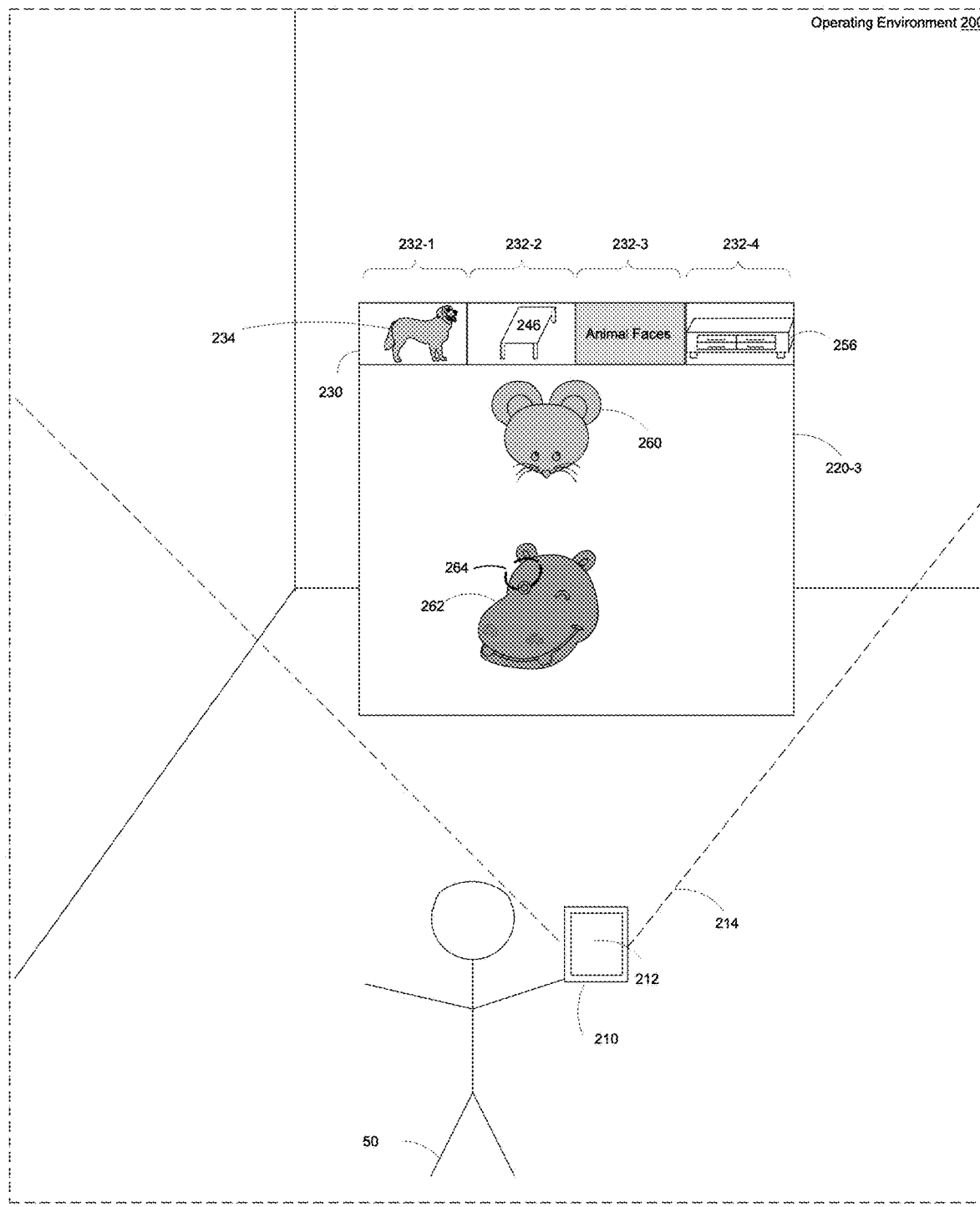
Figure 2Q:
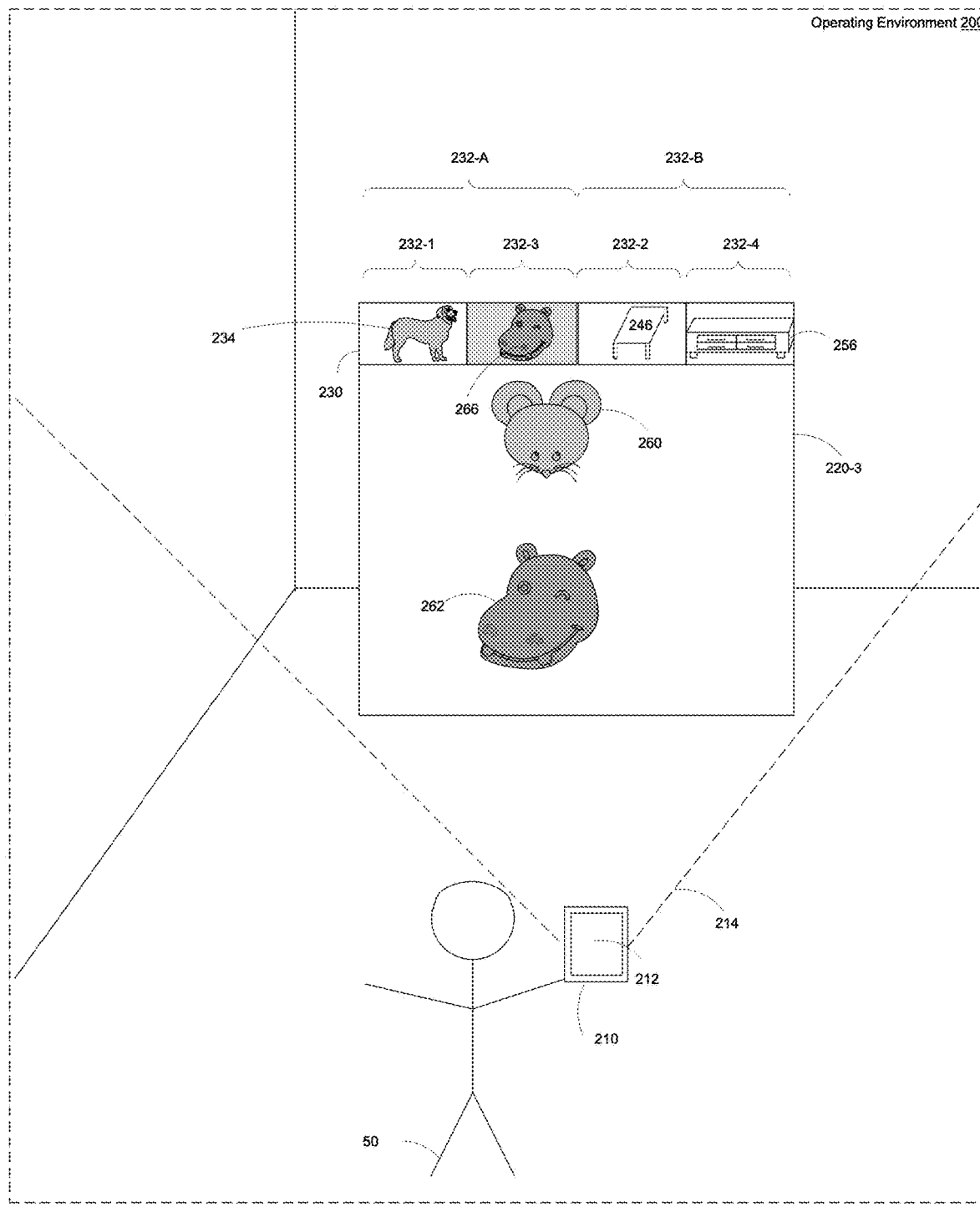

FIGS. 2A-2Q are examples of displaying volumetric representations within respective tabs in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As illustrated in FIG. 2A, an electronic device 210 is associated with an operating environment 200. The electronic device 210 is being held by a user 50 and corresponds to a mobile device, such as a smartphone, laptop, tablet, etc. In some implementations, the operating environment 200 is one of the types of XR settings discussed above. In some implementations, the electronic device 210 is similar to and adapted from the electronic device 100 in FIG. 1.

In some implementations, the electronic device 210 corresponds to a head-mountable device (HMD) that includes an integrated display (e.g., a built-in display) that displays a representation of the operating environment 200. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the representation of the operating environment 200. For example, in some implementations, the electronic device 210 corresponds to a mobile phone that can be attached to the head-mountable enclosure. In various implementations, examples of the electronic device 210 include smartphones, tablets, media players, laptops, etc.

The electronic device 210 includes a display 212. The display 212 is associated with a field-of-view 214 including a portion the operating environment 200. The display 212 displays a tab interface 230 associated with a particular application. For example, the particular application corresponds to a web browsing application, sometimes referred to as a web browser. The tab interface 230 includes a first tab 232-1, a second tab 232-2, and a third tab 232-3. The first tab 232-1 includes a first content indicator indicative of "Cute Pets" content. The second tab 232-2 includes a second content indicator indicative of "Furniture for Sale" content. The third tab 232-3 includes a third content indicator indicative of "Animal Faces" content. The first tab 232-1 has focus (e.g., includes grey fill) because a first content region 220-1 including "Cute Pets" content is currently displayed in FIG. 2A.

The first content region 220-1 includes a plurality of volumetric objects. The plurality of volumetric objects includes a first volumetric object 222 of a first dog, a second volumetric object 224 of a second dog, and a third volumetric object 226 of a cat. The first content region 220-1 is also associated with the particular application that is associated with the first tab 232-1.

In some implementations, the electronic device 210 obtains metadata characterizing the plurality of volumetric objects, and the electronic device 210 selects a particular one of the plurality of volumetric objects based on a function of the metadata. For example, the metadata provides an indication of respective popularity levels associated with the plurality of volumetric objects, such as the number of times other users have interacted with the plurality of volumetric objects over a span of time.

For example, with reference to FIG. 2B, the electronic device 210 selects the second volumetric object 224 based on metadata, as indicated by selection indicator 233 (illustrated for purely explanatory purposes). Continuing with this example, the electronic device 210 selects the second volumetric object 224 because the metadata indicates that the second volumetric object 224 is the most popular volumetric object among the three volumetric objects 222, 224, and 226.

In response to selecting the second volumetric object 224, the electronic device 210 generates a first volumetric representation 234 of the second volumetric object 224 based on a function of the first tab 232-1. The first volumetric representation 234 is displayable within the first tab 232-1. Accordingly, in some implementations, the first volumetric representation 234 corresponds to a reduced-size representation of the second volumetric object 224. As illustrated in FIG. 2C, the electronic device 210 concurrently displays, via the display 212, the first content region 220-1 and the first volumetric representation 234 within the first tab 232-1. The first volumetric representation 234 replaces the first content indicator "Cute Pets." As compared with the textual first content indicator, the first volumetric representation 234 provides a richer set of information characterizing the first content region 220-1.

As illustrated in FIG. 2D, the electronic device 210 detects an input 236 directed to the second tab 232-2. In response to detecting the input 236 in FIG. 2D, the electronic device 210 replaces the first content region 220-1 with a second content region 220-2 that is associated with the second tab 232-2, as illustrated in FIG. 2E. Moreover, the electronic device 210 changes focus from the first tab 232-1 to the second tab 232-2. The second content region 220-2 includes "Furniture for Sale" content. Namely, the second content region 220-2 includes a fourth volumetric object 238 of a chair, a fifth volumetric object 240 of a credenza, and a sixth volumetric object 242 of a table.

As illustrated in FIG. 2F, in some implementations, the electronic device input 210 detects an input 244 that is directed to the sixth volumetric object 242. The input 244 includes a drag gesture that drags the sixth volumetric object 242 to within the second tab 232-2, as is indicated by an arrow. In some implementations, the electronic device 210 includes an extremity tracker (e.g., the extremity tracking sensor 150 in FIG. 1) that provides extremity tracking data associated with the user 50, and the electronic device 210 detects the input 244 based on a function of the extremity tracking data. The extremity tracking data indicates a position of an extremity (e.g., finger(s), hand, foot) of the user 50. As illustrated in FIG. 2G, as the drag gesture proceeds towards the second tab 232-2, the electronic device 210 displays a second volumetric representation 246 that is associated with (e.g., representative of) the sixth volumetric object 242. As illustrated in FIG. 2H, in response to determining termination of the drag gesture within the second tab 232-2, the electronic device 210 displays the sixth volumetric object 242 within the second tab 232-2. The second volumetric representation 246 replaces the second content indicator that indicates "Furniture for Sale."

In some implementations, instead of corresponding to a drag gesture, the input 244 corresponds to a different input type, such as a long touch input, a force touch input, a double tap input, etc. that is directed to the sixth volumetric object 242. In response to the input 244 of the different input type, the electronic device 210 replaces the second content indicator with the second volumetric representation 246.

In some implementations, in response to detecting an input, the electronic device 210 changes a viewing perspective of a volumetric representation within a corresponding tab. For example, in some implementations, as illustrated in FIG. 2I, the electronic device 210 detects an input 250 that rotates the second volumetric representation 246. For example, the electronic device 210 detects the input 250 based on a function of extremity tracking data. In response to detecting the input 250 in FIG. 2I, the electronic device 210 changes the view of the second volumetric representation 246 in order to rotate the second volumetric representation 246, as illustrated in FIG. 2J.

As another example, in some implementations, the input corresponds to a positional change of the electronic device 210 (e.g., as detected by the IMU 130 in FIG. 1). For example, the electronic device 210 is an HMD worn on the head of the user 50, and the user 50 moves to a different location within the operating environment 200 while maintaining a particular volumetric representation within the field-of-view 214. Accordingly, the HMD changes the view (e.g., perspective) of the particular volumetric representation based on the movement of the HMD.

As illustrated in FIG. 2K, the electronic device 210 detects an input 252 that drags the fifth volumetric object 240 to within an area of the operating environment 200 that is outside of but proximate to the tab interface 230. The area is indicated by rectangle 254, which is illustrated for purely explanatory purposes. As illustrated in FIG. 2L, as the drag gesture proceeds towards the area, the electronic device 210 displays a third volumetric representation 256 that is associated with (e.g., representative of) the fifth volumetric object 240. As illustrated in FIG. 2M, in response to determining termination of the drag gesture, the electronic device 210 adds a fourth tab 232-4 to the tab interface 230 and displays the third volumetric representation 256 within the fourth tab 232-4. Moreover, the electronic device 210 moves focus from the second tab 232-2 to the fourth tab 232-4. Because the drag gesture terminates to the right of the tab interface 230, the fourth tab 232 is correspondingly attached to the right side of the tab interface in FIG. 2M. On the other hand, had the drag gesture terminated to the left side of the tab interface 230, the electronic device 210 may have attached the fourth tab 232-4 to the left side of the tab interface 230.

As illustrated in FIG. 2N, the electronic device 210 detects an input 258 directed to the third tab 232-3. In response to detecting the input 258 in FIG. 2N, the electronic device 210 replaces the second content region 220-2 with a third content region 220-3 that is associated with the third tab 232-3, as illustrated in FIG. 2O. Moreover, the electronic device 210 changes focus from the fourth tab 232-4 to the third tab 232-3. The third content region 220-3 includes "Animal Faces" content. Namely, the third content region 220-3 includes a seventh volumetric object 260 of a mouse face and an eighth volumetric object 262 of a hippopotamus face.

As illustrated in FIG. 2P, the electronic device 210 detects an input 264 that is directed to the eighth volumetric object 262, such as a long touch input. In response to detecting the input 264 in FIG. 2P, the electronic device 210 replaces the third content indicator "Animal Faces" with a fourth volumetric representation 266 associated with the eighth volumetric object 262 in FIG. 2Q. Moreover, the electronic device 210 classifies the first volumetric representation 234 (a dog) and the fourth volumetric representation 266 (a hippopotamus face) into an animal grouping. Accordingly, the electronic device 210 displays the animal grouping 232-A in FIG. 2Q. Namely, the animal grouping 232-A includes the first tab 232-1 positioned next to the third tab 232-3, as contrasted with corresponding tabs within the tab interface 230 illustrated in FIG. 2P. Moreover, the electronic device 210 displays ungrouped tabs 232-B, including the second tab 232-2 and the fourth tab 232-4.

Figure 3A:
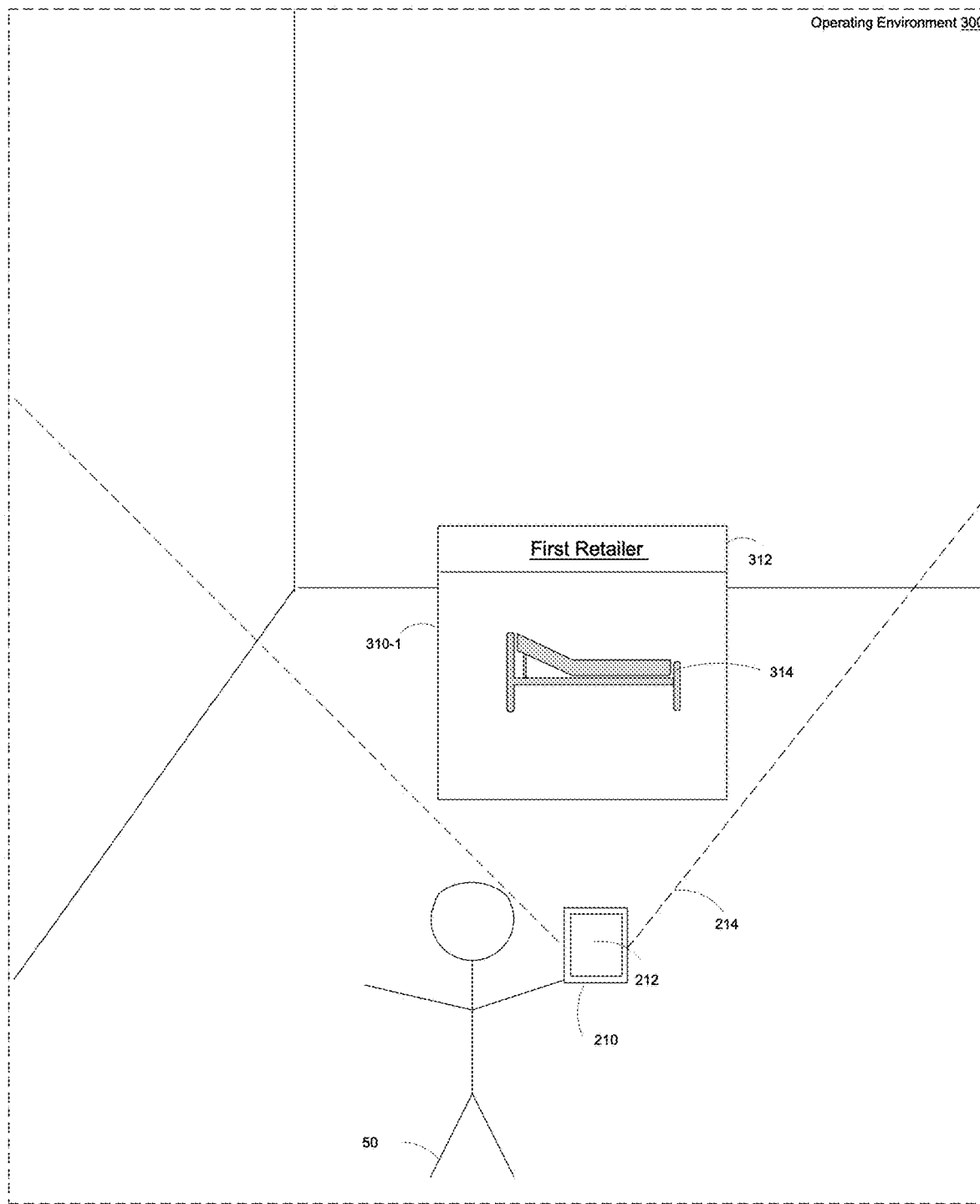
FIGS. 3A-3M are examples of generating a classified browsing history in accordance with some implementations.

FIGS. 3A-3M are examples of generating a classified browsing history in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As illustrated in FIG. 3A, the electronic device 210 is associated with an operating environment 300. In some implementations, the operating environment 300 is similar to the operating environment 200 illustrated in FIGS. 2A-2Q. FIGS. 3A-3M illustrate the display 212 displaying a plurality of content regions respectively corresponding to a plurality of websites 310-1-310-5. However, one of ordinary skill in the art will appreciate that, in some implementations, the device 212 displays content regions corresponding to other application types that support tabbed navigation, such as a drawing application, word processing application, image processing application, and/or the like.

As illustrated in FIG. 3A, the display 212 displays a first website 310-1. The first website 310-1 includes a first volumetric object 314 representing a bed. The first website 310-1 also includes a first website title 312, indicating that the first website 310-1 is associated with a "First Retailer," such as a website hosted by a retailer that is selling the bed. For example, the first volumetric object 314 corresponds to a three-dimensional (3D) model of the bed, which can be moved into another portion of the operating environment 300 (e.g., against the side wall) in order to assist the user 50 in assessing the dimensions of the bed with respect to the operating environment 300.

Figure 3B:
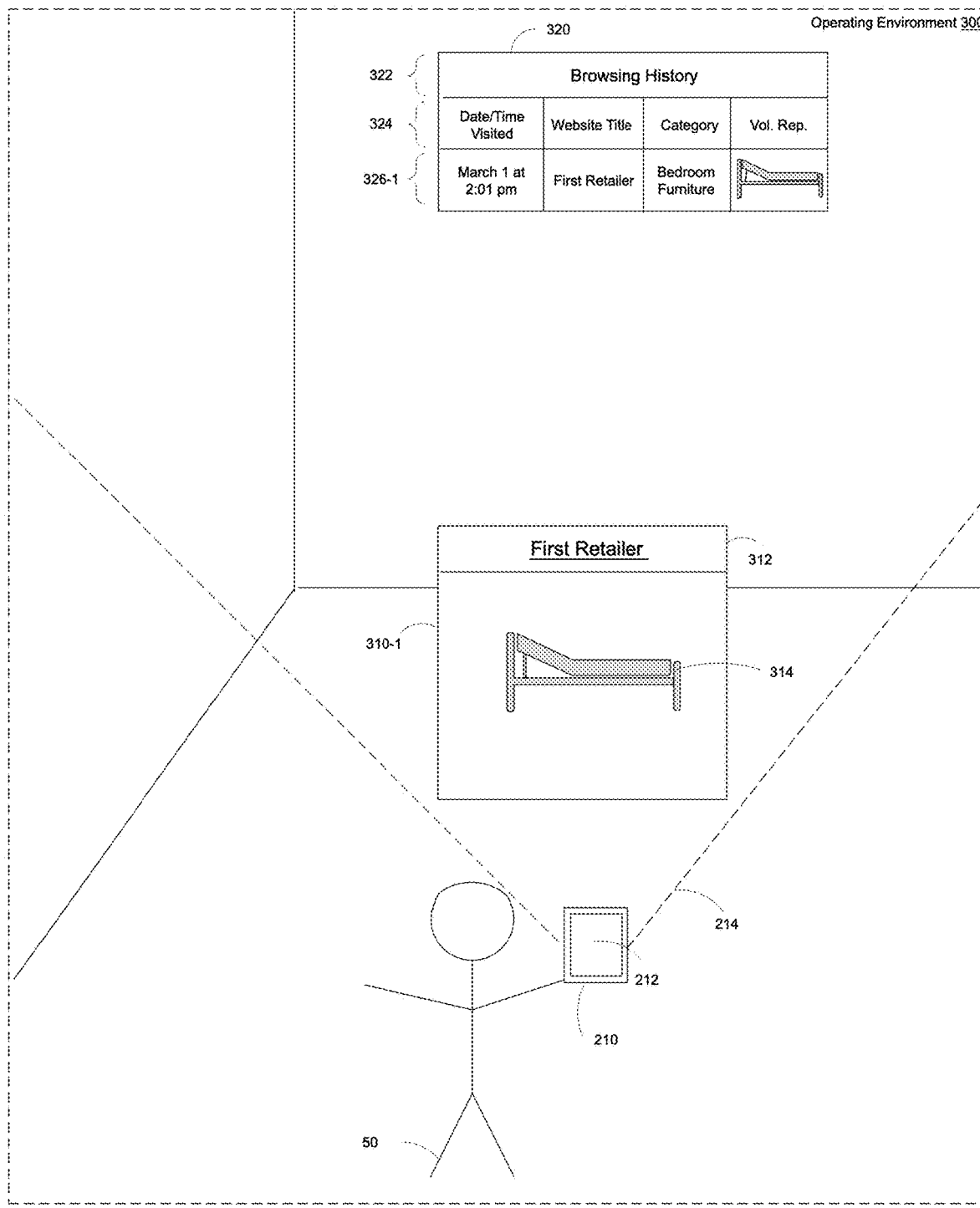

As illustrated in FIG. 3B, the electronic device 210 displays, on the display 212, a browsing history interface 320, as indicated by the "Browsing History" title 322. The browsing history interface 320 includes a description row 324, including various information associated with visited websites. Based on the user 50 visiting the first website 310-1, the electronic device 210 populates a first row 326-1 of the browsing history interface 320. The first row 326-1 includes information associated with the first website 310-1, such as date/time visited, website title, category, and volumetric representation ("vol. rep" for short) of the first volumetric object 314. The electronic device 210 determines a "Bedroom Furniture" category for the volumetric representation of the first volumetric object 314. In some implementations, the electronic device 210 determines the "Bedroom Furniture" category based on a combination of the first volumetric object 314 and metadata associated with the first website 310-1.

Figure 3C:
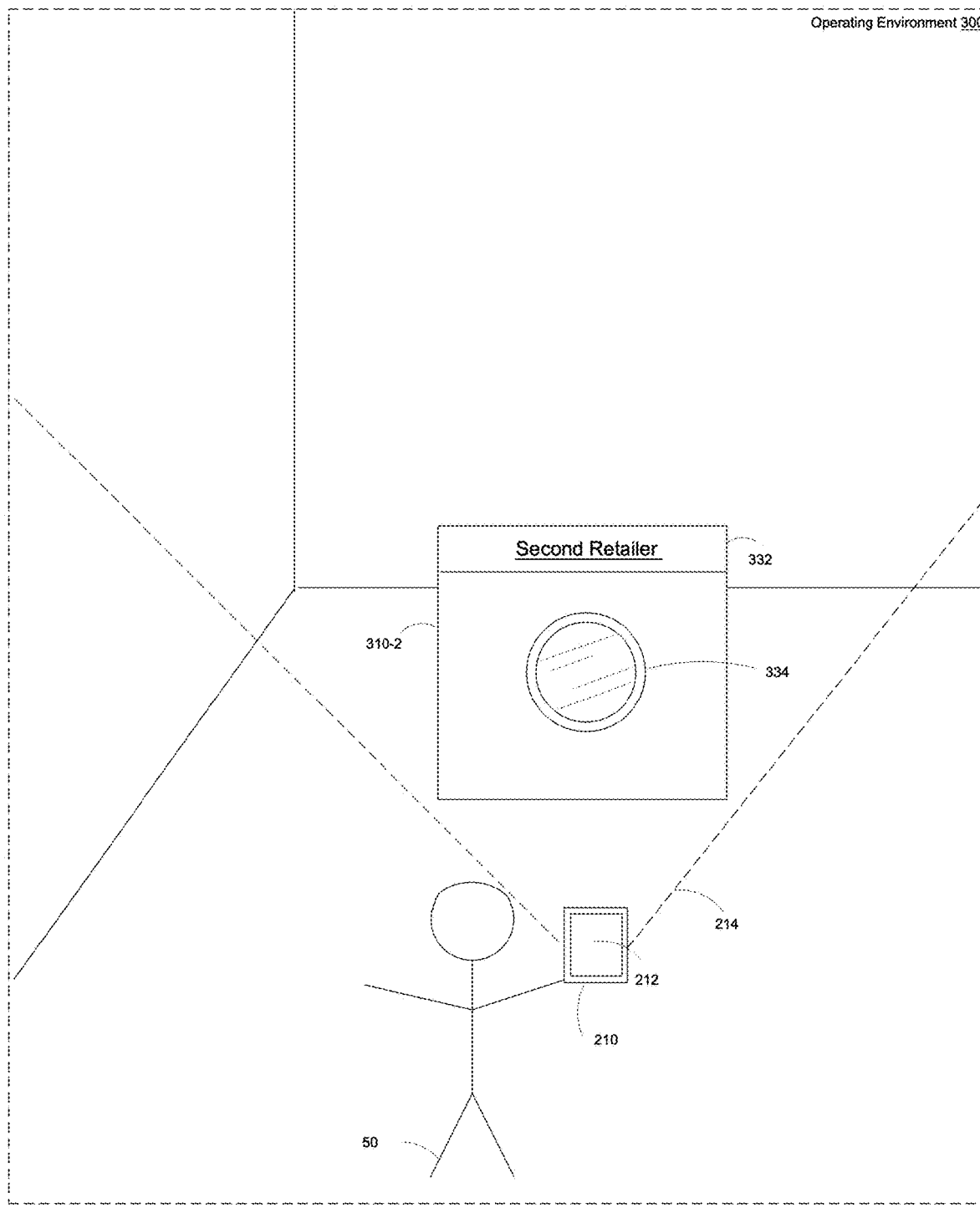
Figure 3D:
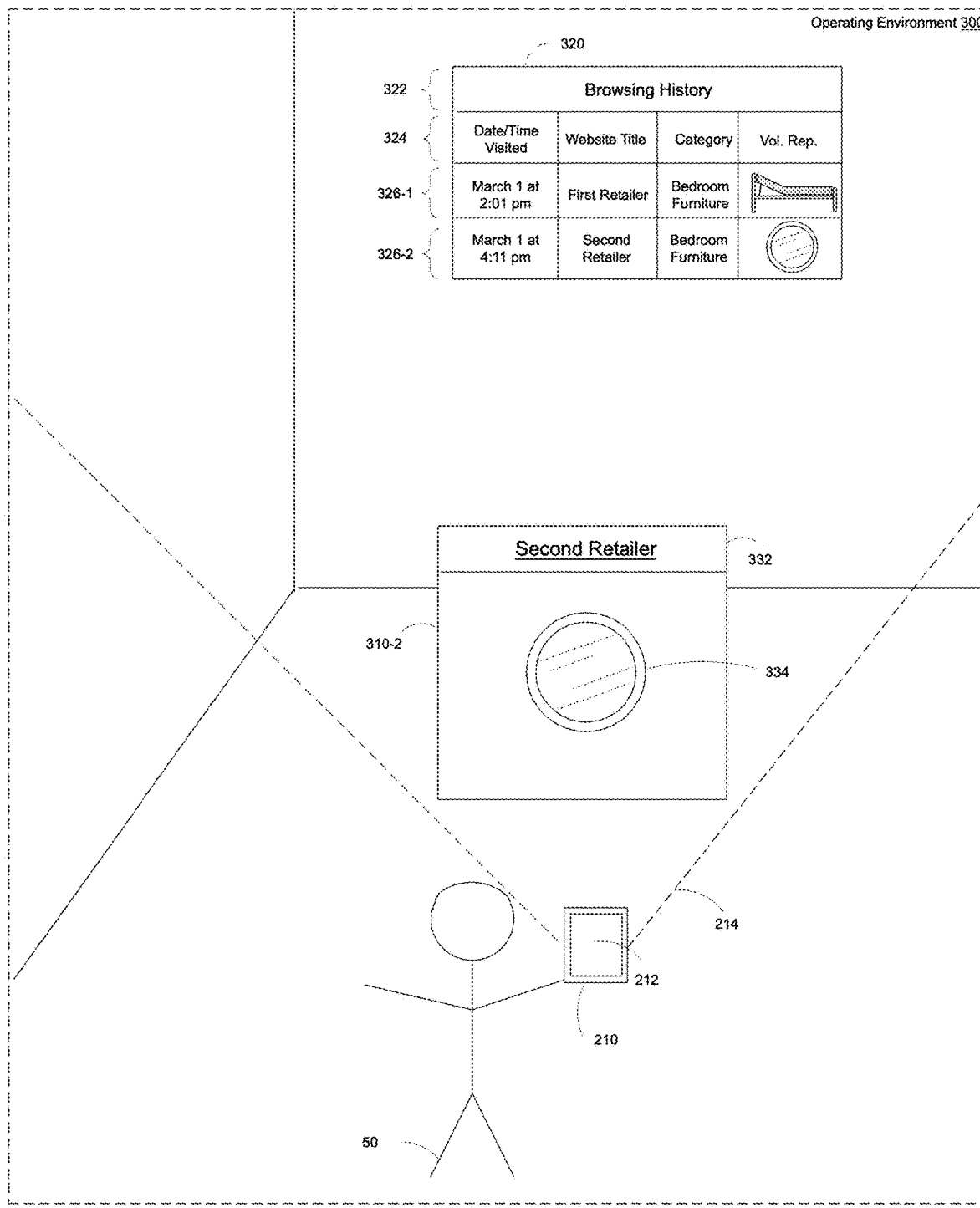

As illustrated in FIG. 3C, the electronic device 210 displays, on the display 212, a second website 310-2 (e.g., the user 50 has navigated to a different website). The second website 310-2 includes a second volumetric object 334 representing a mirror. The second website 310-2 also includes a second website title 332, indicating that the second website 310-2 is associated with a "Second Retailer." As illustrated in FIG. 3D, the electronic device 210 adds, to the bottom of the browsing history interface 320, a second row 326-2 associated with the second website 310-2. The electronic device 210 generates/displays the second row 326-2 in a similar manner to generation/display of the first row 326-1, and thus discussion of generation/display of the second row 326-2 is omitted for the sake of clarity and brevity.

Figure 3E:
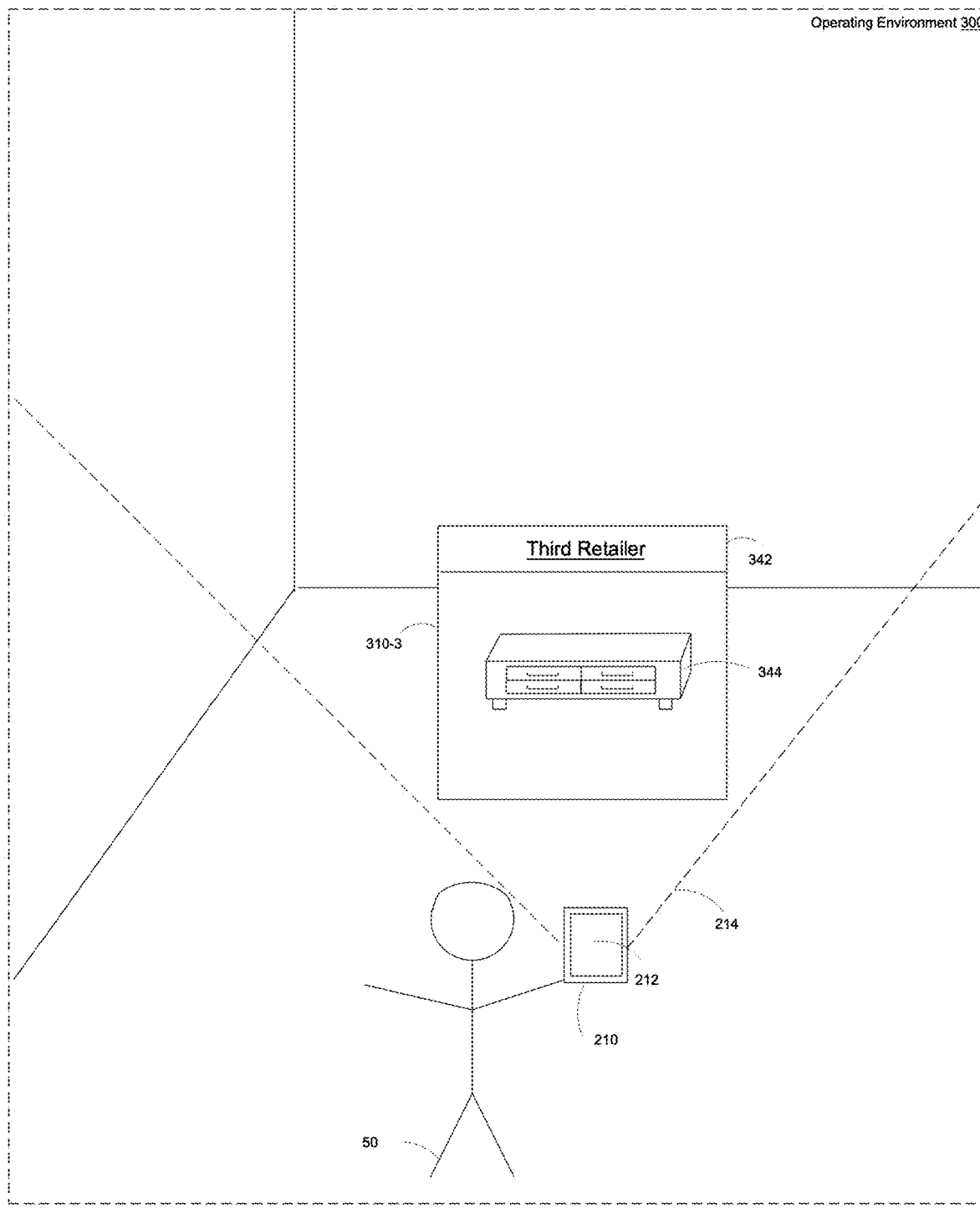
Figure 3F:
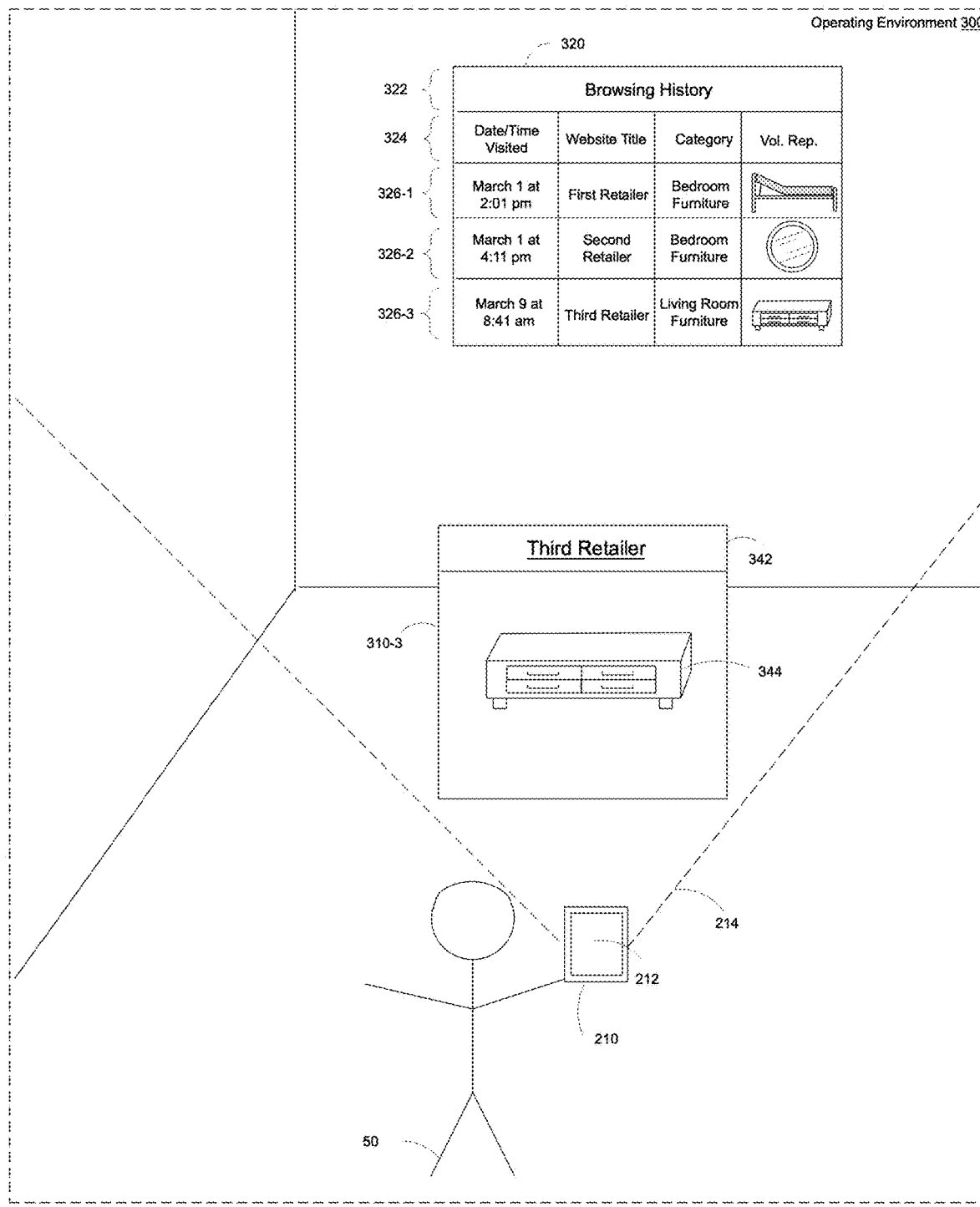

As illustrated in FIG. 3E, the electronic device 210 displays, on the display 212, a third website 310-3. The third website 310-3 includes a third volumetric object 344 representing a credenza. The third website 310-3 also includes a third website title 342, indicating that the third website 310-3 is associated with a "Third Retailer." As illustrated in FIG. 3F, the electronic device 210 adds, to the bottom of the browsing history interface 320, a third row 326-3 associated with the third website 310-3. The electronic device 210 generates/displays the third row 326-3 in a similar manner to generation/display of the first row 326-1, and thus discussion of generation/display of the third row 326-3 is omitted for the sake of clarity and brevity. Notably, the electronic device 210 determines that the volumetric representation of the third volumetric object 344 is associated with a "Living Room Furniture" category, in contrast to the "Bedroom Furniture" category associated with the first volumetric object 314 and the second volumetric object 334. For example, the electronic device 210 determines the "Living Room Furniture" category based on a function of the third volumetric object 344 and/or metadata associated with the third website 310-3.

Figure 3G:
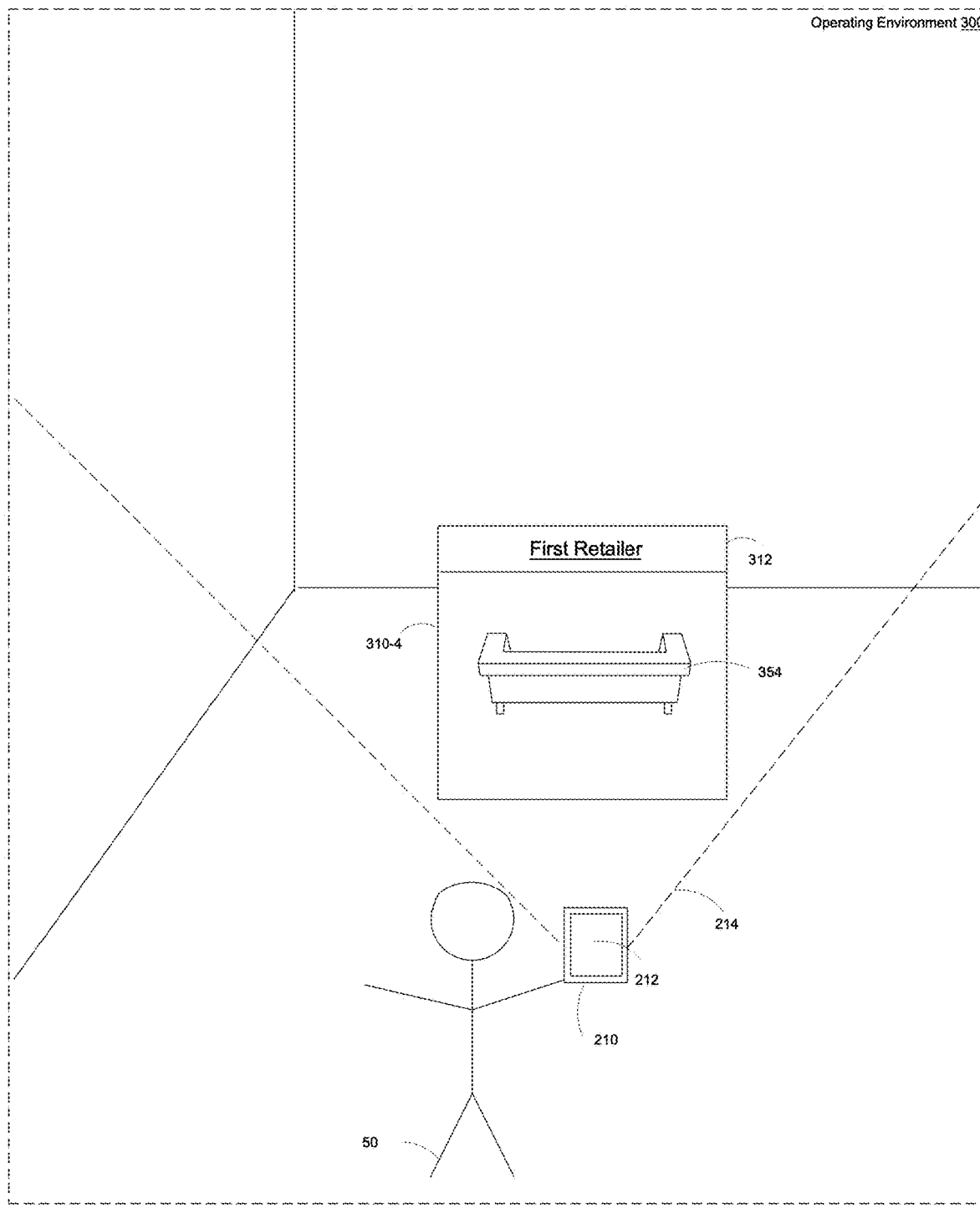
Figure 3H:
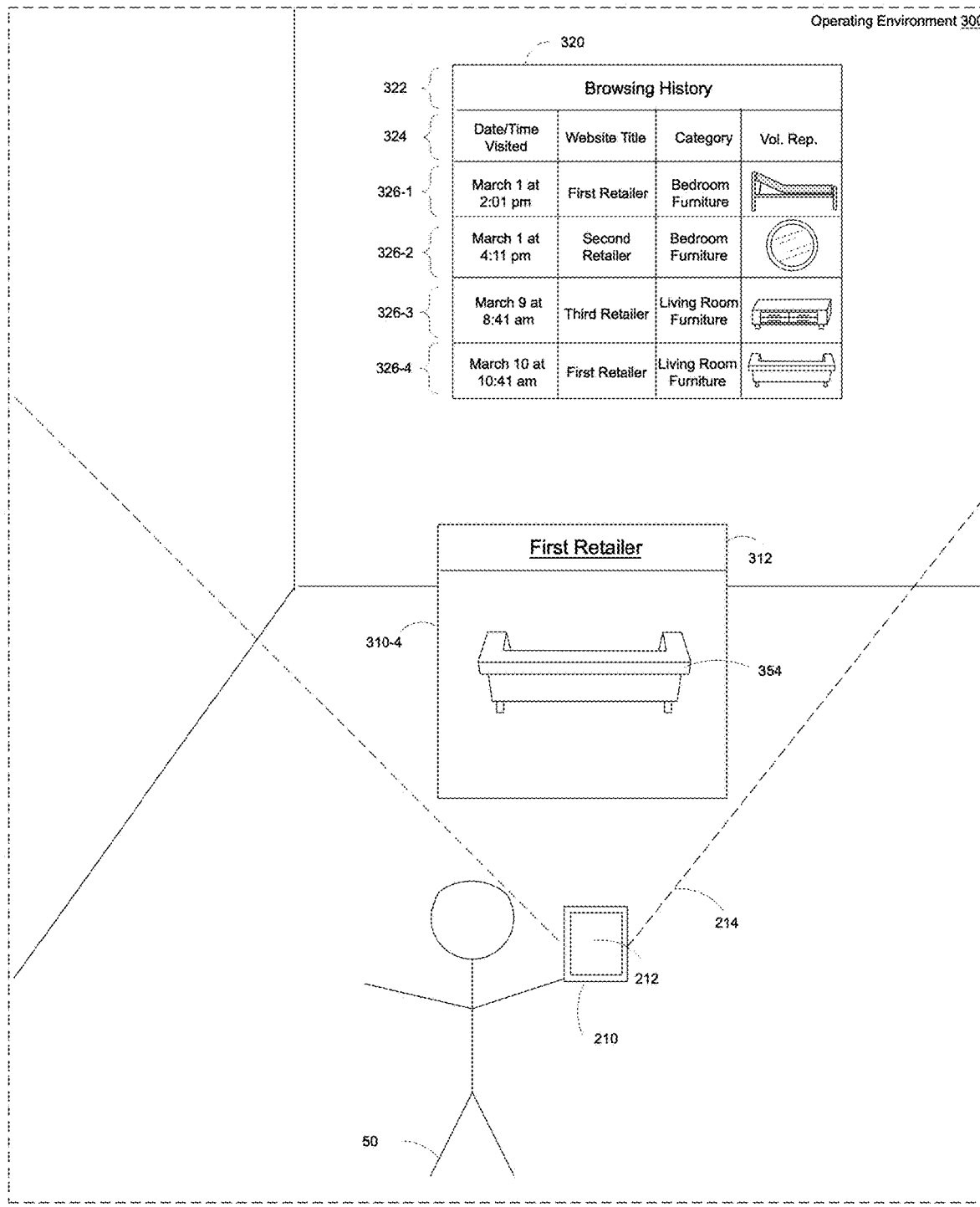

As illustrated in FIG. 3G, the electronic device 210 displays, on the display 212, a fourth website 310-4. The fourth website 310-4 includes a fourth volumetric object 354 representing a couch. The fourth website 310-4 also includes the first website title 312, indicating that the fourth website 310-4 is associated with the "First Retailer." For example, the first website 310-1 and the fourth website 310-4 are hosted by the same furniture manufacturer, the "First Retailer." As illustrated in FIG. 3H, the electronic device 210 adds, to the bottom of the browsing history interface 320, a fourth row 326-4 associated with the fourth website 310-4. The electronic device 210 generates/displays the fourth row 326-4 in a similar manner to generation/display of the first row 326-1, and thus discussion of generation/display of the fourth row 326-4 is omitted for the sake of clarity and brevity.

Figure 3I:
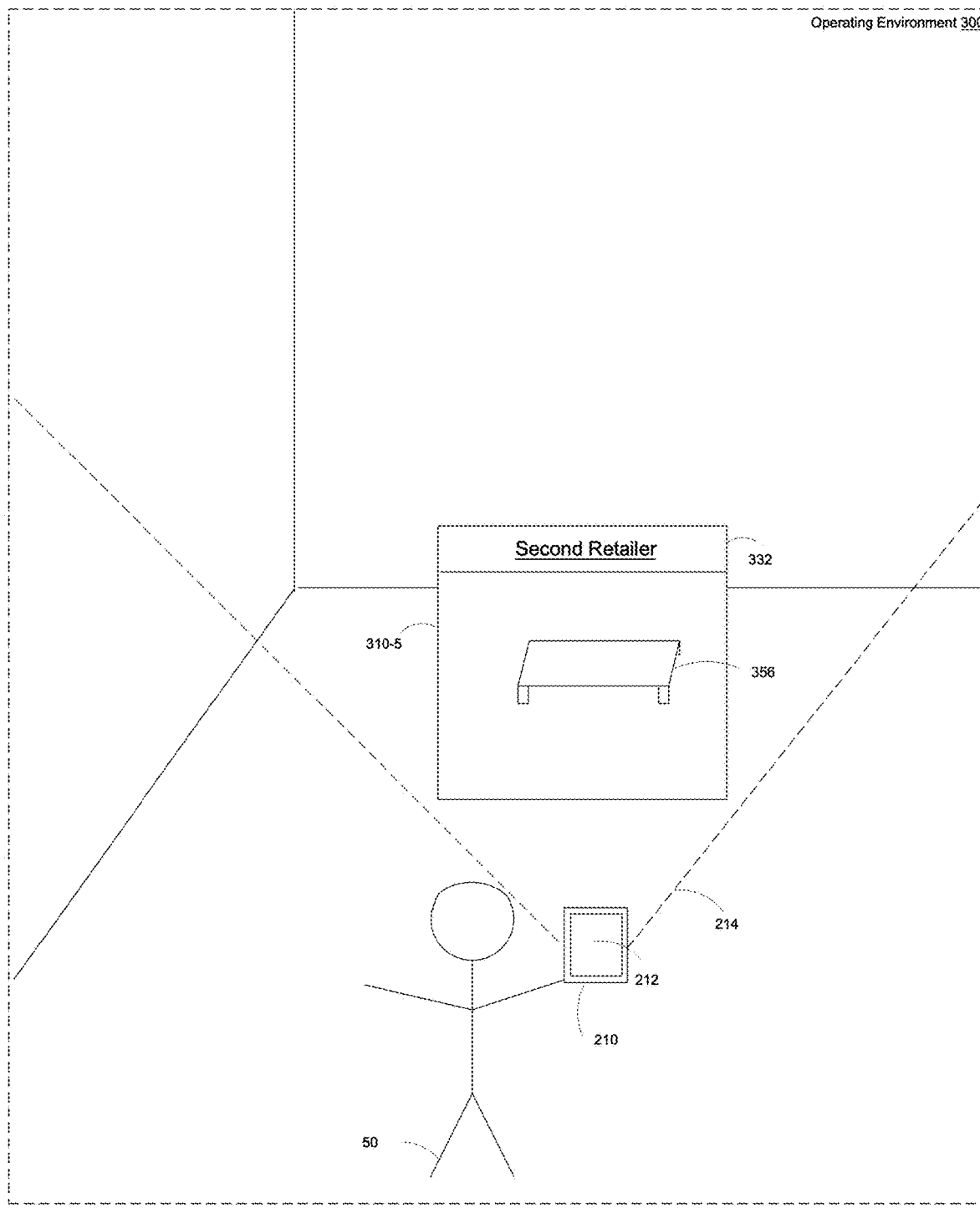
Figure 3J:
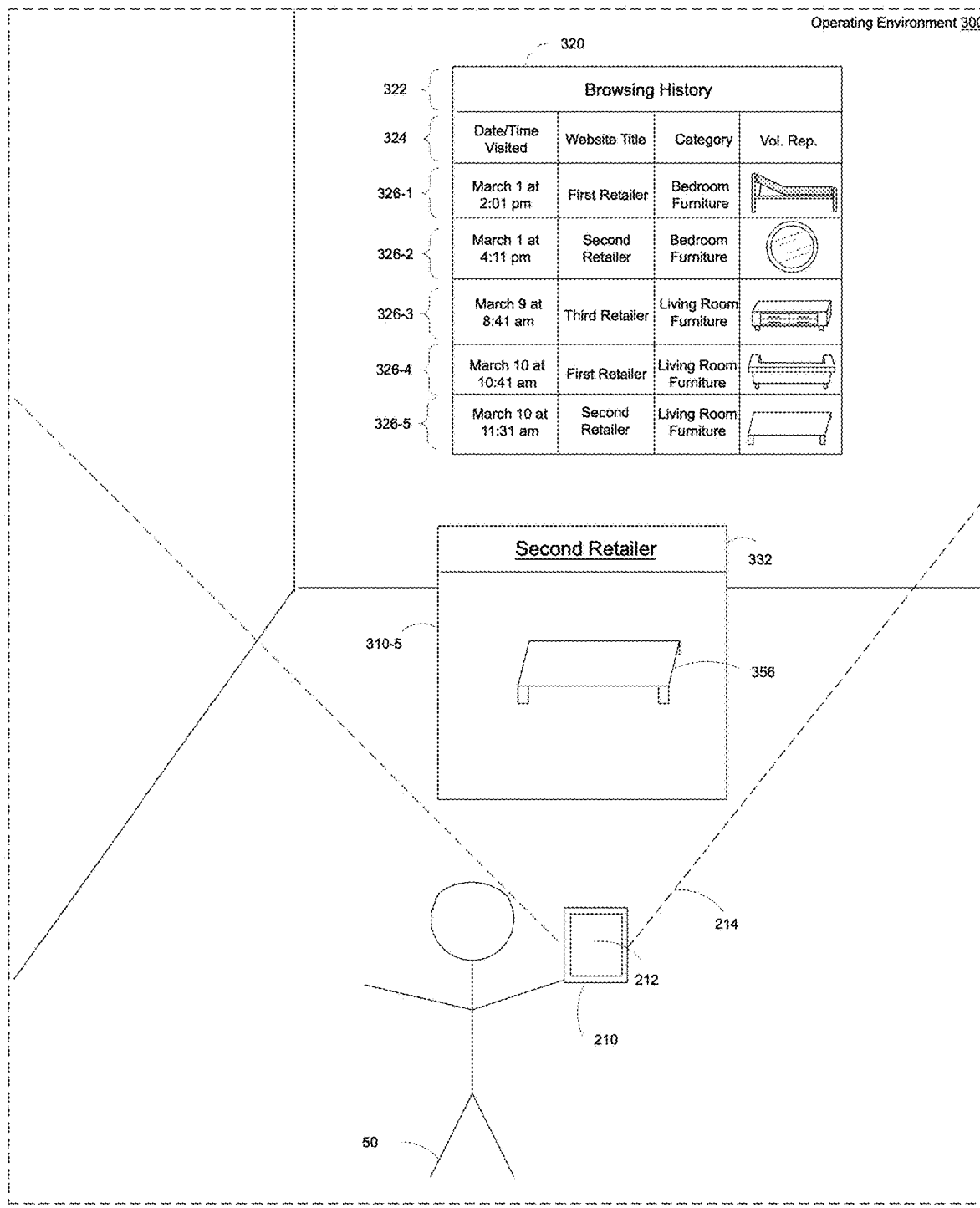

As illustrated in FIG. 3I, the electronic device 210 displays, on the display 212, a fifth website 310-5. The fifth website 310-5 includes a fifth volumetric object 356 representing a table. The fifth website 310-5 also includes the second website title 332, indicating that the fifth website 310-5 is associated with the "Second Retailer." For example, the second website 310-2 and the fifth website 310-5 are hosted by the same furniture manufacturer, the "Second Retailer." As illustrated in FIG. 3J, the electronic device 210 adds, to the bottom of the browsing history interface 320, a fifth row 326-5 associated with the fifth website 310-5. The electronic device 210 generates/displays the fifth row 326-5 in a similar manner to generation/display of the first row 326-1, and thus discussion of generation/display of the fifth row 326-5 is omitted for the sake of clarity and brevity.

Figure 3K:
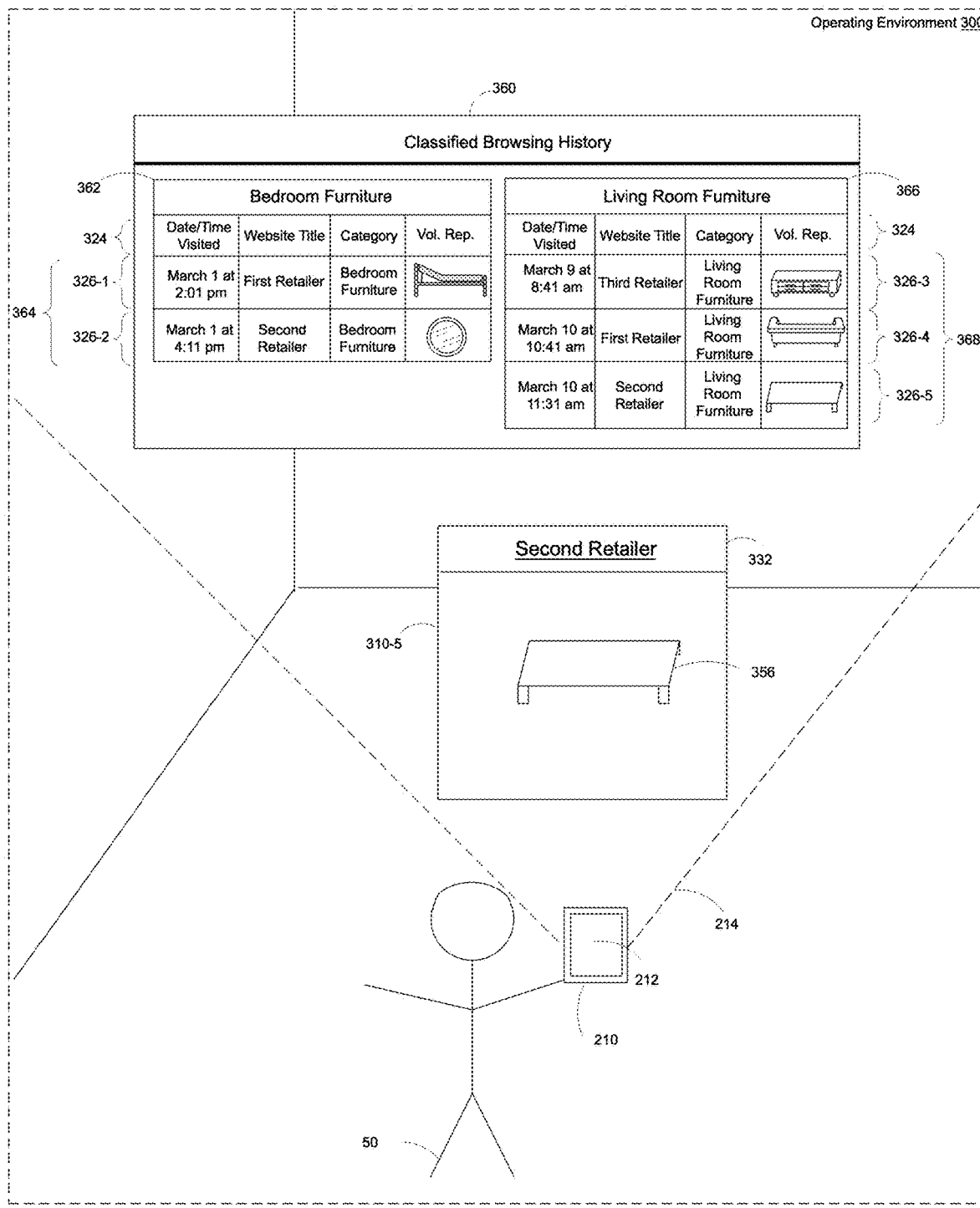

In some implementations, based on the respective categories associated with the generated volumetric representations, the electronic device 210 generates and displays a classified browsing history interface 360, as illustrated in FIG. 3K. The classified browsing history interface 360 includes a bedroom furniture interface 362, as indicated by a "Bedroom Furniture" category indicator at the top of the bedroom furniture interface 362. The bedroom furniture interface 362 includes rows corresponding to visited bedroom furniture websites, as is indicated by 364. The classified browsing history interface 360 also includes a living room furniture interface 366, as indicated by a "Living Room Furniture" category indicator at the top of the living room furniture interface 366. The living room furniture interface 366 includes rows corresponding to visited living room websites, as is indicated by 368.

The bedroom furniture interface 362 and the living room furniture interface 366 are distinct interfaces. Accordingly, in some implementations, in response to detecting a manipulation input selecting (e.g., dragging) one of the bedroom furniture interface 362 or the living room furniture interface 366, the electronic device 210 manipulates (e.g., moves, resizes, zooms into/out of) the selected interface accordingly, while maintaining the appearance of the unselected interface.

Figure 3L:
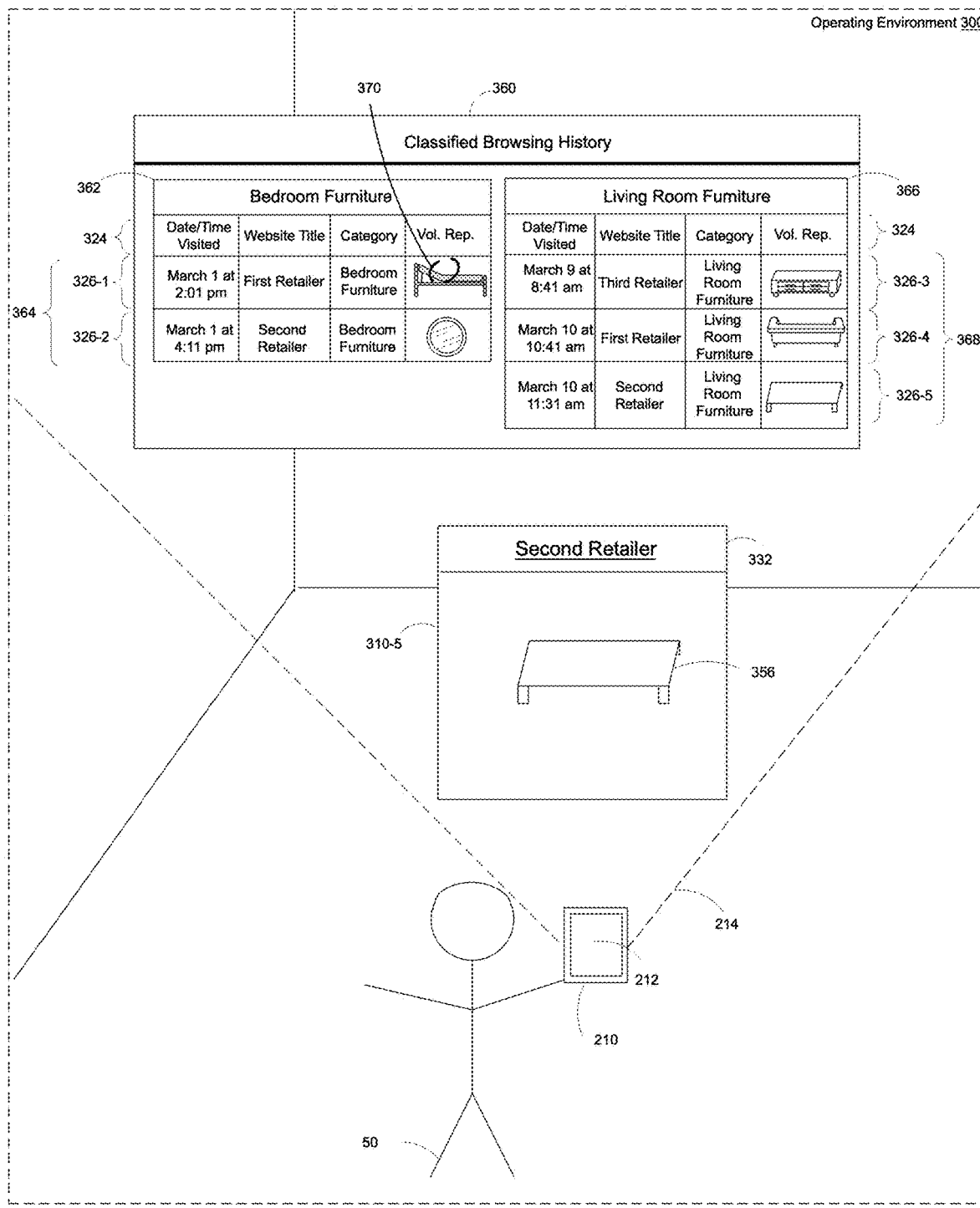
Figure 3M:
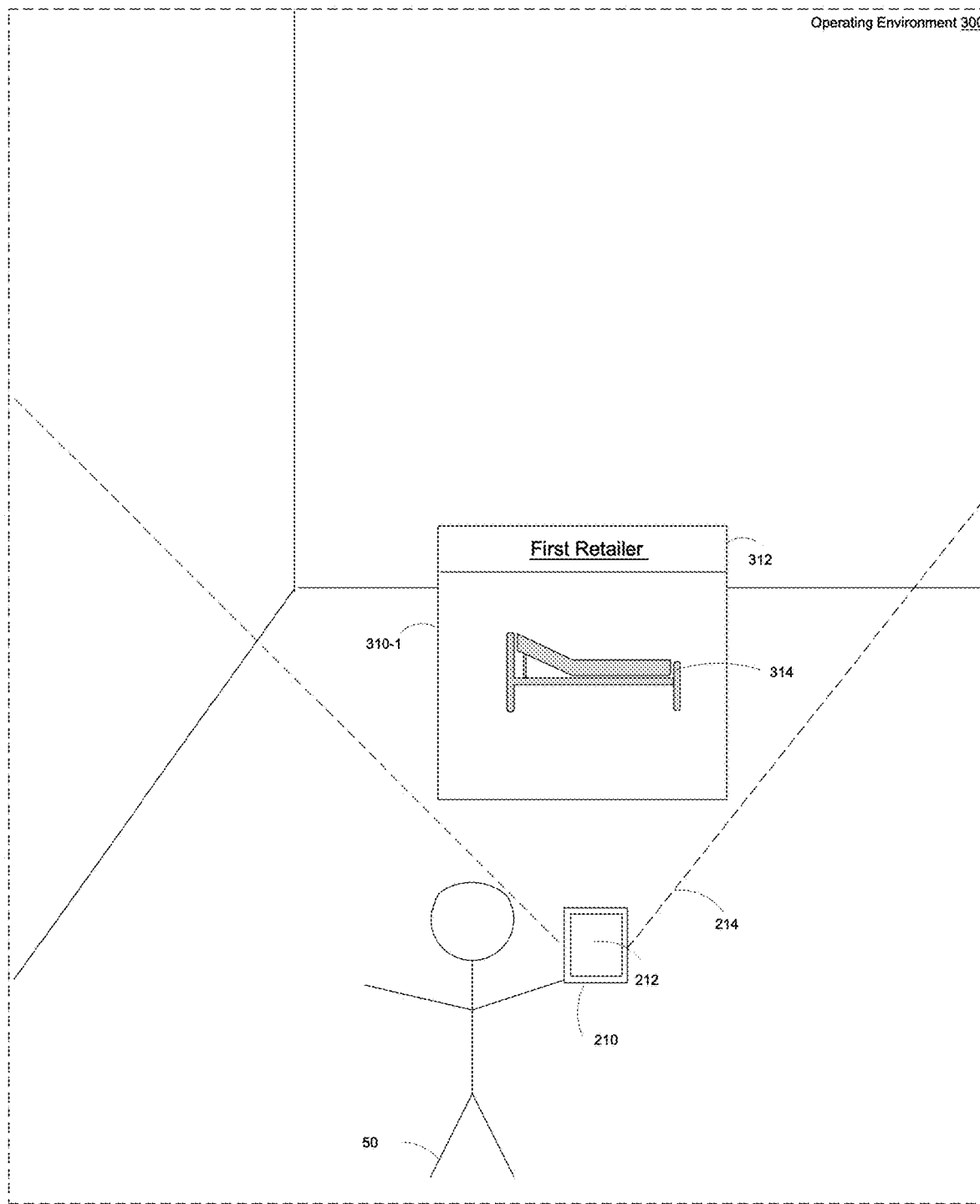

As illustrated in FIG. 3L, the electronic device 210 detects an input 370 directed to the volumetric representation of the first volumetric object 314 within the bedroom furniture interface 362. In response to detecting the input 370, the electronic device 210 in FIG. 3M replaces the currently displayed fifth website 310-5 with the first website 310-1, because the first website 310-1 is associated with the selected volumetric representation. Accordingly, in contrast to conventional, chronological-based browsing history interfaces, the classified browsing history interface 360, with its volumetric representations, enables more efficient navigation through different application content.

Figure 4:
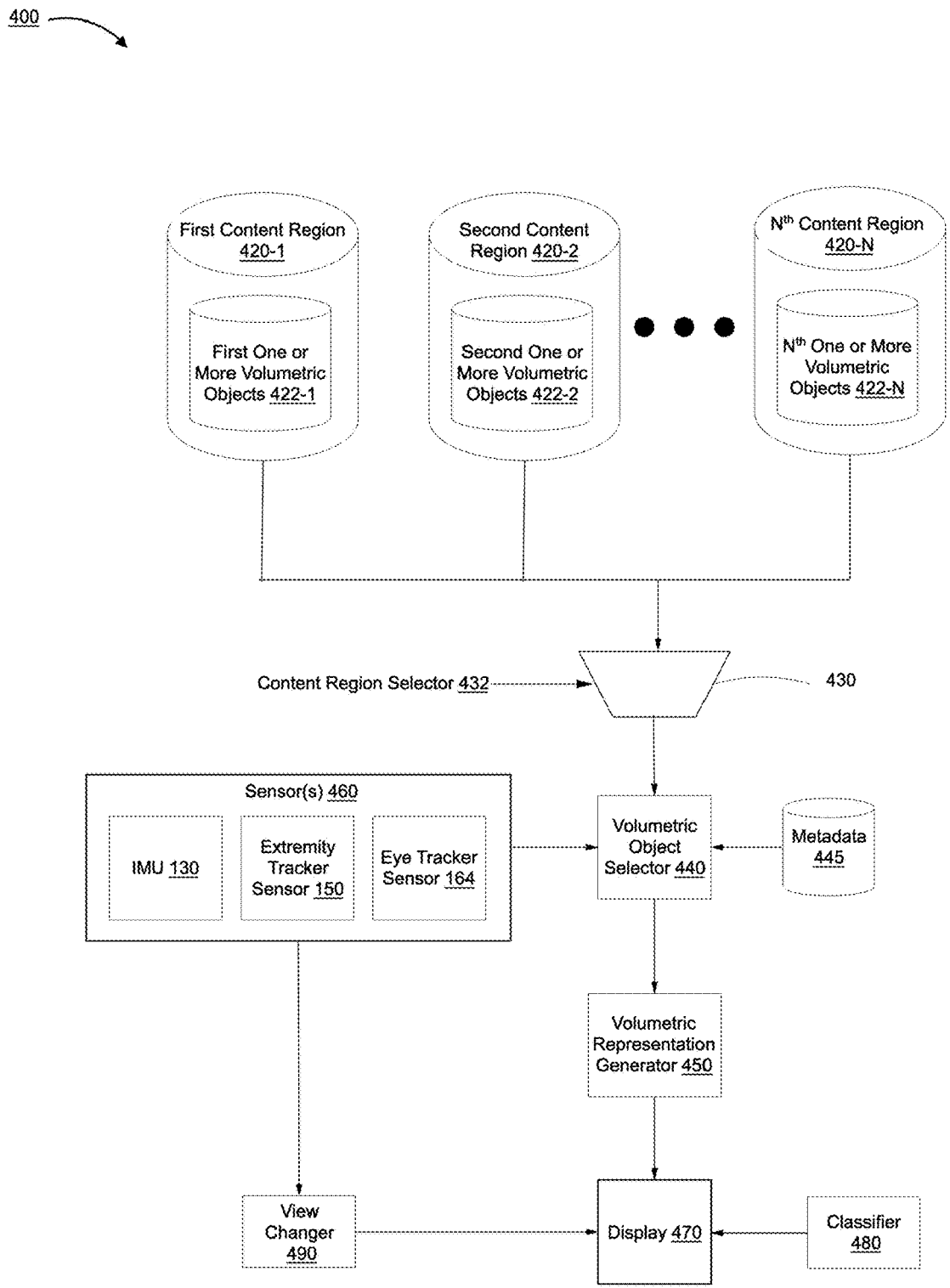
FIG. 4 is an example of a block diagram of a system for displaying volumetric representations within respective tabs in accordance with some implementations.

FIG. 4 is an example of a block diagram of a system 400 for displaying volumetric representations within respective tabs in accordance with some implementations. The system 400 displays, on a display 470, a portion of a plurality of content regions 420-1-420-N. In some implementations, the plurality of content regions 420-1-420-N is associated with a common application (e.g., web browsing application, image editing application, etc.). Each of the plurality of content regions 420-1-420-N includes a respective set of one or more respective volumetric objects 422-1-422-N. For example, with reference to FIG. 2A, the first content region 220-1 includes the first volumetric object 222 of the first dog, the second volumetric object 224 of the second dog, and the third volumetric object 226 of the cat. Each of the plurality of content regions 420-1-420-N is associated with a respective tab. For example, with reference to FIG. 2A, the first content region 220-1 is associated with the first tab 232-1, the second content region 220-2 is associated with the first tab 232-2, and the third content region 220-3 is associated with the third tab 232-3.

In some implementations, the system 400 includes a multiplexer 430 for selecting one of the plurality of content regions 420-1-420-N. To that end, the multiplexer 430 receives a content region selector 432 that specifies a particular one of the plurality of content regions 420-1-420-N. For example, in some implementations, the content region selector 432 corresponds to an input directed to a particular tab, such as the input 236 directed to the second tab 232-2 in FIG. 2D. As another example, in some implementations, the system 400 determines (e.g., automatically) the content region selector 432 based on configuration settings of the application associated with the plurality of content regions 420-1-420-N, such as displaying a home page content region upon startup of a web browsing application. Based on the selected application window, the multiplexer 430 provides, to a volumetric object selector 440, respective one or more volumetric objects corresponding to the selected content region. For example, when the content region selector 432 specifies the second content region 420-2, the multiplexer 430 outputs the second one or more volumetric objects 422-2 to the volumetric object selector 440.

The volumetric object selector 440 selects a particular volumetric object of the one or more volumetric objects. In some implementations, the volumetric object selector 440 selects the particular volumetric object based on metadata, such as described with reference to FIG. 2B. For example, in some implementations, the system 400 obtains metadata (e.g., from a database) and stores the metadata in a metadata datastore 445. In some implementations, the volumetric object selector 440 selects the particular volumetric object based on user input. To that end, the system 400 may include a variety of sensors 460, such as an IMU 130, an extremity tracking sensor 150, an eye tracking sensor 164, and/or the like. For example, with reference to FIGS. 2F-2H, based in part on the input 244 received by the extremity tracking sensor, the electronic device 210 determines that an extremity of the user 50 is directed to the sixth volumetric object 242. Accordingly, the volumetric object selector 440 selects the sixth volumetric object 242.

In some implementations, the system 400 includes a volumetric representation generator 450 that generates a volumetric representation of the selected volumetric object based on a function of a tab. The tab is associated with the selected content region. For example, in some implementations, the volumetric representation generator 450 generates the volumetric representation based on dimensions of the tab, in order to enable the volumetric representation to fit within the tab. Accordingly, in some implementations, the volumetric representation corresponds to a reduced-size representation of the selected volumetric object. The volumetric representation generator 450 provides the volumetric representation to the display 470. The display 470 concurrently displays the selected content region and the volumetric representation within the tab.

In some implementations, the system 400 composites computer-generated content with pass-through image data. The computer-generated content includes one or more volumetric representations within one or more respective tabs. For example, in some augmented reality (AR) implementations, the system 400 includes an image sensor that obtains pass-through image data characterizing a physical environment, and the system 400 displays, on the display 470, the computer-generated content composited with the pass-through image data.

In some virtual reality (VR) implementations, the system 400 displays, on the display 470, entirely computer-generated content that includes one or more volumetric representations within one or more respective tabs.

In some implementations, the display 470 corresponds to a see-through display that permits ambient light from a physical environment through the see-through display. For example, the see-through display is a translucent display, such as glasses with optical see-through. In some implementations, the see-through display is an additive display that enables optical see-through of the physical surface, such as an optical HMD (OHMD). For example, unlike purely compositing using pass-through image data, the additive display is capable of reflecting projected images off of the display while enabling the user to see through the display. In some implementations, the see-through display includes a photochromic lens. Thus, in some implementations, the system 400 adds the computer-generated content to the light from the physical environment that enters the see-through display 470.

In some implementations, the system 400 includes a classifier 480 that classifies a plurality of volumetric representation into different categories. For example, with reference to FIGS. 3A-3M, the classifier 480 classifies various volumetric representations into a "Bedroom Furniture" category or a "Living Room Furniture" category. Continuing with this example, in some implementations, the display 212 displays a classified browsing history interface 360 based on the classification, as illustrated in FIG. 3L.

According to various implementations, the system 400 changes the appearance of one or more volumetric representations, based on a user input. To that end, in some implementations, the system 400 includes a view changer 490 that receives one or more inputs from the one or more sensor(s) 460. Based on the one or more inputs, the view changes 490 changes the appearance of the one or more volumetric representations on the display 470. For example, in response to detecting the input 250 (e.g., via the extremity tracking sensor 150) directed to rotating the second volumetric representation 246 in FIG. 2I, the electronic device 210 changes the appearance of the second volumetric representation 246 in order to rotate the second volumetric representation 246 in FIG. 2J. As another example, in some implementations, the view changer 490 receives, from the IMU 130, data indicative of a positional change of the system 400, such as data indicating that the system 400 is moving around one or more volumetric representations. Continuing with this example, the view changer 490 changes the appearance of the one or more volumetric representations according to the positional change of the system 400, such as changing the viewing perspective (e.g., point-of-view) of the one or more volumetric representations.

Figure 5:
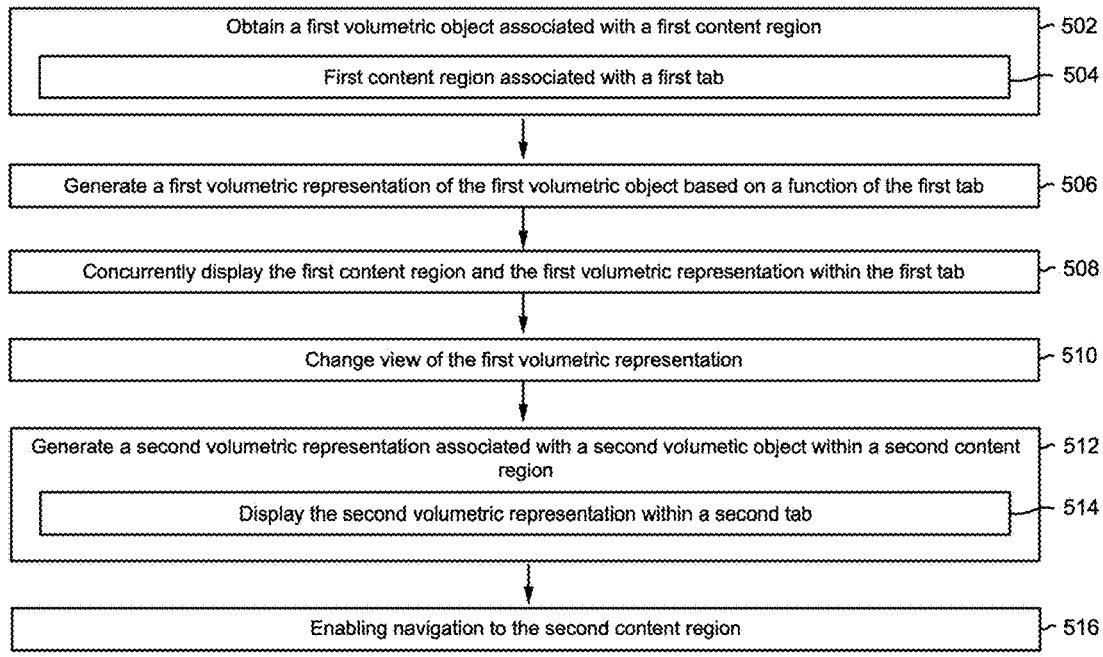
FIG. 5 is an example of a flow diagram of a method of displaying volumetric representations within respective tabs in accordance with some implementations.

FIG. 5 is an example of a flow diagram of a method 500 of displaying volumetric representations within respective tabs in accordance with some implementations. In various implementations, the method 500 or portions thereof are performed by an electronic device (e.g., the electronic device 100 in FIG. 1 or the electronic device 210 in FIGS. 2A-2Q or FIGS. 3A-3M). In various implementations, the method 500 or portions thereof are performed by the system 400. In various implementations, the method 500 or portions thereof are performed by a head-mountable device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes obtaining a first volumetric object associated with a first content region. For example, with reference to FIG. 2A, the electronic device 210 obtains the first volumetric object 222 (e.g., representing the first dog) that is associated with the first content region 220-1. As represented by block 504, the first content region is associated with a first tab, such as the first content region 220-1 being associated with the first tab 232-1, as is illustrated in FIG. 2A. In some implementations, the first content region is associated with an application that is operable to concurrently display multiple, selectable tabs. Each of the tabs is associated with (e.g., represents) a respective content region. For example, the application is one of a web browsing application, drawing application, etc. In some implementations, the first volumetric object corresponds to a three-dimensional (3D) model of a physical object, such as a 3D model of a couch.

As represented by block 506, the method 500 includes generating a first volumetric representation of the first volumetric object based on a function of the first tab, such as the based on the dimensions of the first tab. The first volumetric representation is displayable within the first tab. Accordingly, in some implementations, the first volumetric representation corresponds to a reduced-size representation of the first volumetric object. For example, with reference to FIG. 2C, the electronic device 210 generates a first volumetric representation 234 of the second volumetric object 224 based on a function of the first tab 232-1. In some implementations, the first volumetric representation provides a preview of the first volumetric object. The first volumetric representation may be annotated, such as with the price of the couch, dimensions of the couch, etc. In some implementations, the display displays the first volumetric representation from a first viewing vector. The first viewing vector provides a combination of field-of-view (FOV), pose/rotational coordinates, translational coordinates, perspective, and/or the like, associated with the first volumetric representation.

As represented by block 508, the method 500 includes concurrently displaying, on the display, the first content region and the first volumetric representation within the first tab. For example, with reference to FIG. 2H, the electronic device 210 displays, on the display 212, the second volumetric representation 246 with the second tab 232-2. In some implementations, the display displays a plurality of tabs, with the selected tab having focus, such as displaying the selected tab with a grey fill. In some implementations, the first tab abuts (e.g., shares a boundary with) the first content region.

As represented by block 510, in some implementations, the method 500 includes changing the view of the first volumetric representation, such as is described with reference to the view changer 490 in FIG. 4. For example, in some implementations, the method 500 includes detecting an input associated with (e.g., directed to) the first volumetric representation, and in response to receiving the input, changing display of the first volumetric representation from the first viewing vector to a second viewing vector. For example, detecting the input is based on a function of extremity tracking data. In some implementations, the input changes the orientation of the first volumetric representation, such as rotating the first volumetric representation or translating the first volumetric representation along an axis (e.g., x-y axis). As another example, the input corresponds to a change in position of the electronic device from a first pose to a second pose relative to the first volumetric representation. To that end, in some implementations, the electronic device includes an IMU that detects the change in position of the electronic device.

As represented by block 512, in some implementations, the method 500 includes, obtaining a second volumetric object associated with a second content region. The second content region is different from the first content region. The second content region is associated with a second tab. Moreover, the method 500 includes generating a second volumetric representation of the second volumetric object based on a function of the second tab. The second volumetric representation is displayable within the second tab. As represented by block 514, in some implementations, while concurrently displaying the first content region and the first volumetric representation within the first tab, the method 500 includes displaying the second volumetric representation within the second tab. For example, with reference to FIG. 2H, the display 212 concurrently displays the first volumetric representation 234 within the first tab 232-1 and the second volumetric representation 246 within the second tab 232-2.

As represented by block 516, in some implementations, the method 500 includes enabling navigation to the second content region via the second volumetric representation. To that end, in some implementations, the method 500 includes receiving an input directed to the second volumetric representation. In response to receiving the input, the method 500 includes replacing display of the first content region with the second content region, and moving focus from the first tab to the second tab.

Figure 6:
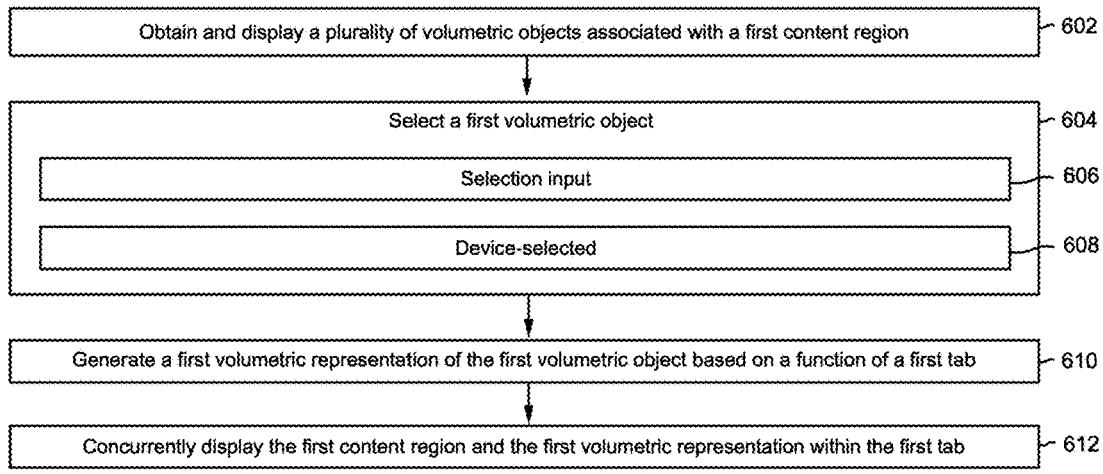
FIG. 6 is an example of a flow diagram of a method of selecting a volumetric representation from a plurality of volumetric representations in accordance with some implementations.

FIG. 6 is an example of a flow diagram of a method 600 of selecting a volumetric representation from a plurality of volumetric representations in accordance with some implementations. In various implementations, the method 600 or portions thereof are performed by an electronic device (e.g., the electronic device 100 in FIG. 1 or the electronic device 210 in FIGS. 2A-2Q or FIGS. 3A-3M). In various implementations, the method 600 or portions thereof are performed by the system 400. In various implementations, the method 600 or portions thereof are performed by a head-mountable device (HMD). In some implementations, the method 600 is performed by processing logic, including hardware, firmware, software, or a combination thereof. In some implementations, the method 600 is performed by a processor executing code stored in a non-transitory computer-readable medium (e.g., a memory). In various implementations, some operations in method 600 are, optionally, combined and/or the order of some operations is, optionally, changed.

As represented by block 602, in some implementations, the method 600 includes obtaining and displaying a plurality of volumetric objects associated with a first content region. For example, with reference to FIG. 2A, the electronic device 210 displays, on the display 212, the first volumetric object 222 of the first dog, the second volumetric object 224 of the second dog, and the third volumetric object 226 of the cat.

As represented by block 604, in some implementations, the method 600 includes selecting the first volumetric object from the plurality of volumetric objects.

In some implementations, as represented by block 606, selecting the first volumetric object includes receiving, via an input device, a selection input that is directed to the first volumetric object. The selection input may be directed to a location that corresponds to the first volumetric object. An electronic device may utilize a combination of extremity tracking and eye tracking to determine which volumetric object is selected. The selection input may correspond to any one of a variety of gestures, such as a long touch, a tap, a double tap, and/or the like. For example, with reference to FIGS. 2F-2H, the selection input includes an input 244 (e.g., a drag gesture) that is directed to the sixth volumetric object 242 and terminates within the second tab 232-2. As another example, with reference to FIGS. 2P and 2Q, the selection input includes an input 264 (e.g., a long touch input) directed to the eighth volumetric object 262, resulting in display of the fourth volumetric representation 266 within the third tab 232-3.

In some implementations, as represented by block 608, the method 600 includes obtaining metadata characterizing the plurality of volumetric objects, wherein selecting the first volumetric object is a function of the metadata. For example, the metadata indicates browsing history of a user (e.g., the user 50 often views red, L-shaped couches), and the selected object is a red, L-shaped couch. As another example, the metadata indicates browsing histories of other users, such as which object is commonly viewed/purchased, and the electronic device selects the object accordingly. Selecting the first volumetric object based on the metadata may be independent of user intervention.

In some implementations, as represented by block 610, in response to selecting the first volumetric object, the method 600 includes generating a first volumetric representation of the first volumetric object based on a function of a first tab. Moreover, the method 600 includes concurrently displaying the first content region and the first volumetric representation within the first tab. For example, with reference to FIG. 2H, in response to detecting the input 244, the electronic device 210 displays, on the display 212, the second volumetric representation 246 within the second tab 232-2.

Figure 7:
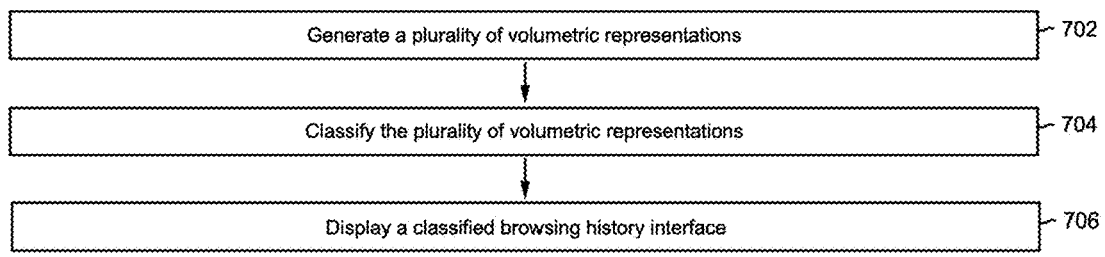
FIG. 7 is an example of a flow diagram of a method of classifying volumetric representations in accordance with some implementations.

FIG. 7 is an example of a flow diagram of a method 700 of classifying volumetric representations in accordance with some implementations. In various implementations, the method 700 or portions thereof are performed by an electronic device (e.g., the electronic device 100 in FIG. 1 or the electronic device 210 in FIGS. 2A-2Q or FIGS. 3A-3M). In various implementations, the method 700 or portions thereof are performed by the system 400. In various implementations, the method 700 or portions thereof are performed by a head-mountable device (HMD). In some implementations, the method 700 is performed by processing logic, including hardware, firmware, software, or a combination thereof. In some implementations, the method 700 is performed by a processor executing code stored in a non-transitory computer-readable medium (e.g., a memory). In various implementations, some operations in method 700 are, optionally, combined and/or the order of some operations is, optionally, changed.

In some implementations, as represented by block 702, the method 700 includes generating a plurality of volumetric representations displayable within a respective plurality of tabs. For example, with reference to FIGS. 3A-3J, based on visiting a plurality of websites 310-1-310-5, the electronic device 210 generates a corresponding plurality of volumetric representations. The corresponding plurality of volumetric representations are included in the rightmost column ("Vol. Rep.") of the browsing history interface 320, within corresponding rows 326-1-326-5.

In some implementations, as represented by block 702, the method 700 includes classifying the plurality of volumetric representations. To that end, in some implementations, the method 700 includes obtaining metadata characterizing the plurality of volumetric representations, such as "red couch," "queen bed," "landscape portrait," and/or the like. To that end, in some implementations, the method 700 includes semantically identifying the plurality of volumetric representations in order to determine a plurality of semantic values respectively associated with the plurality of volumetric representations. In some implementations, classifying the plurality of volumetric representations includes classifying a first subset of the plurality of volumetric representations into a first category, and classifying a second subset of the plurality of volumetric representations into a second category. The second category is different from the first category. For example, with reference to FIG. 3K, the method 700 includes classifying a first subset of volumetric representations into a "Bedroom Furniture" group, and classifying a second subset of volumetric representations into a "Living Room Furniture" group.

In some implementations, as represented by block 706, the method 700 includes displaying, on the display, a classified browsing history interface including a first category indicator and a second category indicator. The first category indicator is indicative of the first category, and the second category indicator is indicative of the second category. For example, with reference to FIG. 3K, the display 212 displays the classified browsing history interface 360 that includes a first category indicator "Bedroom Furniture" at the top of the bedroom furniture interface 362, and a second category indicator "Living Room Furniture" at the top of the living room furniture interface 366.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device with one or more processors, a non-transitory memory, and a display:
displaying, via the display, a container overlaid on a physical environment, wherein the container includes a first content region and a tab bar with a first tab for the first content region, the first tab comprising a first content indicator for the first content region;
displaying, via the display, a plurality of volumetric objects within the first content region while displaying the container overlaid on the physical environment;
selecting a first volumetric object from the plurality of volumetric objects, wherein selecting the first volumetric object includes receiving, via an input device, a selection input that is directed to the first volumetric object, wherein the selection input corresponds to a drag input that terminates within the first tab; and
in response to the selecting the first volumetric object:
generating a first volumetric representation of the first volumetric object based on a function of the first tab, wherein the first volumetric representation is displayable within the first tab; and
updating the first tab to include the first volumetric representation within the first tab while maintaining display of the container overlaid on the physical environment and while maintaining display of the plurality of volumetric objects within the first content region, wherein updating the first tab includes replacing the first content indicator with the first volumetric representation.

2. The method of claim 1, wherein the first volumetric representation corresponds to a reduced size representation of the first volumetric object.

3. The method of claim 1, wherein generating the first volumetric representation is a function of dimensions of the first tab.

4. The method of claim 1, further comprising:
obtaining a second volumetric object associated with a second content region that is different from the first content region, wherein the second content region is associated with a second tab;
generating a second volumetric representation of the second volumetric object based on a function of the second tab, and wherein the second volumetric representation is displayable within the second tab; and
displaying, on the display, the second volumetric representation within the second tab.

5. The method of claim 4, further comprising:
receiving an input directed to the second volumetric representation; and
in response to receiving the input:
replacing display of the first content region with the second content region; and
moving focus from the first tab to the second tab.

6. The method of claim 1, further comprising:
generating a plurality of volumetric representations displayable within a respective plurality of tabs, wherein the plurality of volumetric representations includes the first volumetric representation; and
classifying the plurality of volumetric representations.

7. The method of claim 6, wherein classifying the plurality of volumetric representations includes:
classifying a first subset of the plurality of volumetric representations into a first category; and
classifying a second subset of the plurality of volumetric representations into a second category that is different from the first category.

8. The method of claim 7, further comprising displaying, on the display, a classified browsing history interface including a first category indicator and a second category indicator, wherein the first category indicator is indicative of the first category, and wherein the second category indicator is indicative of the second category.

9. The method of claim 1, wherein the first volumetric representation is displayed from a first viewing vector, the method further comprising:
detecting an input associated with the first volumetric representation; and
in response to detecting the input, changing display of the first volumetric representation from the first viewing vector to a second viewing vector.

10. The method of claim 9, wherein detecting the input is based on a function of extremity tracking data.

11. The method of claim 9, wherein the input corresponds to a change in position of the electronic device from a first pose to a second pose relative to the first volumetric representation.

12. The method of claim 1, wherein the first volumetric representation is characterized by a respective plurality of depths, and wherein updating the first tab includes displaying the first volumetric representation at the respective plurality of depths.

13. The method of claim 12, wherein the first volumetric object is characterized by a respective plurality of depths, and wherein updating the first tab includes concurrently displaying:
the first volumetric representation at the respective plurality of depths, and
the first volumetric object at the respective plurality of depths.

14. A non-transitory computer readable storage medium storing instructions, which, when executed by one or more processors of a device with a display, cause the device to:
display, via the display, a container overlaid on a physical environment, wherein the container includes a first content region and a tab bar with a first tab for the first content region, the first tab comprising a first content indicator for the first content region;
display, via the display, a plurality of volumetric objects within the first content region while displaying the container overlaid on the physical environment;
select a first volumetric object from the plurality of volumetric objects, wherein selecting the first volumetric object includes receiving, via an input device, a selection input that is directed to the first volumetric object, wherein the selection input corresponds to a drag input that terminates within the first tab; and
in response to the selecting the first volumetric object:
generate a first volumetric representation of the first volumetric object based on a function of the first tab, wherein the first volumetric representation is displayable within the first tab; and
update the first tab to include the first volumetric representation within the first tab while maintaining display of the container overlaid on the physical environment and while maintaining display of the plurality of volumetric objects within the first content region, wherein updating the first tab includes replacing the first content indicator with the first volumetric representation.

15. The non-transitory computer readable storage medium of claim 14, to wherein the instructions further cause the device to:
generate a plurality of volumetric representations displayable within a respective plurality of tabs, wherein the plurality of volumetric representations includes the first volumetric representation;
classify the plurality of volumetric representations;
classify a first subset of a plurality of volumetric representations into a first category, wherein the first category includes the first volumetric representation; and
classify a second subset of the plurality of volumetric representations into a second category that is different from the first category.

16. The non-transitory computer readable storage medium of claim 14, wherein the first volumetric representation is displayed from a first viewing vector, and wherein the instructions further cause the device to:
detect an input associated with the first volumetric representation; and
in response to detecting the input, change display of the first volumetric representation from a first viewing vector to a second viewing vector.

17. An electronic device comprising:
one or more processors;
a non-transitory memory;
a display; and
one or more programs, wherein the one or more programs are stored in the non-transitory memory and configured to be executed by the one or more processors, the one or more programs including instructions for:
displaying, via the display, a container overlaid on a physical environment, wherein the container includes a first content region and a tab bar with a first tab for the first content region, the first tab comprising a first content indicator for the first content region;

displaying, via the display, a plurality of volumetric objects within the first content region while displaying the container overlaid on the physical environment;

selecting a first volumetric object from the plurality of volumetric objects, wherein selecting the first volumetric object includes receiving, via an input device, a selection input that is directed to the first volumetric object, wherein the selection input corresponds to a drag input that terminates within the first tab; and in response to the selecting the first volumetric object:

generating a first volumetric representation of the first volumetric object based on a function of the first tab, wherein the first volumetric representation is displayable within the first tab; and updating the first tab to include the first volumetric representation within the first tab while maintaining display of the container overlaid on the physical environment and while maintaining display of the plurality of volumetric objects within the first content region, wherein updating the first tab includes replacing the first content indicator with the first volumetric representation.

\* \* \* \* \*